(12) United States Patent
Cheok et al.

(10) Patent No.: US 11,172,209 B2
(45) Date of Patent: Nov. 9, 2021

(54) ANALYTICS-MODULATED CODING OF SURVEILLANCE VIDEO

(71) Applicant: CheckVideo LLC, Falls Church, VA (US)

(72) Inventors: Lai-Tee Cheok, Herndon, VA (US); Nikhil Gagvani, Potomac Falls, VA (US)

(73) Assignee: CheckVideo LLC, Falls Church, VA (US)

(*) Notice: Subject to any disclaimer, the term of this patent is extended or adjusted under 35 U.S.C. 154(b) by 0 days.

(21) Appl. No.: 15/843,430

(22) Filed: Dec. 15, 2017

(65) Prior Publication Data

US 2018/0139456 A1 May 17, 2018

Related U.S. Application Data

(60) Division of application No. 14/966,083, filed on Dec. 11, 2015, now abandoned, which is a continuation of
(Continued)

(51) Int. Cl.
*H04N 19/167* (2014.01)
*H04N 7/18* (2006.01)
(Continued)

(52) U.S. Cl.
CPC ............ *H04N 19/167* (2014.11); *H04N 7/18* (2013.01); *H04N 7/183* (2013.01);
(Continued)

(58) Field of Classification Search
CPC .. H04N 19/167; H04N 19/107; H04N 19/114; H04N 19/115; H04N 19/124;
(Continued)

(56) References Cited

U.S. PATENT DOCUMENTS 5,434,617 A 7/1995 Bianchi
5,455,561 A 10/1995 Brown
(Continued)

FOREIGN PATENT DOCUMENTS

EP 0482427 4/1992
WO WO 96/31047 10/1996

OTHER PUBLICATIONS

International Search Report and Written Opinion from International Application No. PCT/US2008/070134, dated Oct. 7, 2008.
(Continued)

*Primary Examiner* — Maria E Vazquez Colon
(74) *Attorney, Agent, or Firm* — Cooley LLP

(57) ABSTRACT

A method and apparatus for encoding surveillance video where one or more regions of interest are identified and the encoding parameter values associated with those regions are specified in accordance with intermediate outputs of a video analytics process. Such an analytics-modulated video compression approach allows the coding process to adapt dynamically based on the content of the surveillance images. In this manner, the fidelity of the region of interest is increased relative to that of a background region such that the coding efficiency is improved, including instances when no target objects appear in the scene. Better compression results can be achieved by assigning different coding priority levels to different types of detected objects.

27 Claims, 14 Drawing Sheets

Related U.S. Application Data application No. 12/620,232, filed on Nov. 17, 2009, now Pat. No. 9,215,467.

(60) Provisional application No. 61/115,427, filed on Nov. 17, 2008.

(51) Int. Cl.

| | | |
|---|---|---|
| *H04N 19/176* | (2014.01) | |
| *H04N 19/172* | (2014.01) | |
| *H04N 19/149* | (2014.01) | |
| *H04N 19/115* | (2014.01) | |
| *H04N 19/61* | (2014.01) | |
| *H04N 19/107* | (2014.01) | |
| *H04N 19/114* | (2014.01) | |
| *H04N 19/124* | (2014.01) | |
| *H04N 19/132* | (2014.01) | |
| *H04N 19/14* | (2014.01) | |
| *H04N 19/137* | (2014.01) | |
| *H04N 19/142* | (2014.01) | |
| *H04N 19/152* | (2014.01) | |
| *H04N 19/177* | (2014.01) | |
| *H04N 19/17* | (2014.01) | |
| *H04N 19/146* | (2014.01) | |
| *H04N 19/70* | (2014.01) | |

(52) U.S. Cl.
CPC ......... *H04N 19/107* (2014.11); *H04N 19/114* (2014.11); *H04N 19/115* (2014.11); *H04N 19/124* (2014.11); *H04N 19/132* (2014.11); *H04N 19/137* (2014.11); *H04N 19/14* (2014.11); *H04N 19/142* (2014.11); *H04N 19/146* (2014.11); *H04N 19/149* (2014.11); *H04N 19/152* (2014.11); *H04N 19/17* (2014.11); *H04N 19/172* (2014.11); *H04N 19/176* (2014.11); *H04N 19/177* (2014.11); *H04N 19/61* (2014.11); *H04N 19/70* (2014.11)

(58) Field of Classification Search
CPC .... H04N 19/132; H04N 19/137; H04N 19/14; H04N 19/142; H04N 19/146; H04N 19/149; H04N 19/152; H04N 19/17; H04N 19/176; H04N 19/177; H04N 19/61; H04N 19/70; H04N 7/18; H04N 7/183

See application file for complete search history.

(56) References Cited

U.S. PATENT DOCUMENTS

| | | | |
|---|---|---|---|
| 5,579,471 A | 11/1996 | Barber et al. | |
| 5,592,567 A | 1/1997 | Kilger | |
| 5,602,585 A | 2/1997 | Dickinson et al. | |
| 5,689,442 A | 11/1997 | Swanson et al. | |
| 5,706,367 A | 1/1998 | Kondo | |
| 5,724,475 A | 3/1998 | Kirsten | |
| 5,729,295 A | 3/1998 | Okada et al. | |
| 5,745,166 A | 4/1998 | Rhodes et al. | |
| 5,761,326 A | 6/1998 | Brady et al. | |
| 5,809,200 A | 9/1998 | Nishimoto et al. | |
| 5,825,413 A | 10/1998 | Mullis | |
| 5,886,743 A | 3/1999 | Oh et al. | |
| 5,923,364 A | 7/1999 | Rhodes et al. | |
| 5,953,488 A | 9/1999 | Seto | |
| 5,959,672 A | 9/1999 | Sasaki | |
| 5,969,764 A | 10/1999 | Sun et al. | |
| 5,982,418 A | 11/1999 | Ely | |
| 6,025,877 A | 2/2000 | Chang et al. | |
| 6,031,573 A | 2/2000 | MacCormack et al. | |
| 6,043,847 A | 3/2000 | Kadono et al. | |
| 6,055,330 A | 4/2000 | Eleftheriadis et al. | |
| 6,069,655 A | 5/2000 | Seeley et al. | |
| 6,075,559 A | 6/2000 | Harada | |
| 6,097,429 A | 8/2000 | Seeley et al. | |
| 6,122,411 A | 9/2000 | Shen et al. | |
| 6,148,030 A | 11/2000 | Katata et al. | |
| 6,148,140 A | 11/2000 | Okada et al. | |
| 6,151,413 A | 11/2000 | Jang | |
| 6,166,763 A | 12/2000 | Rhodes et al. | |
| 6,182,069 B1 | 1/2001 | Niblack | |
| 6,233,226 B1 | 5/2001 | Gringeri et al. | |
| 6,233,356 B1 | 5/2001 | Haskell et al. | |
| 6,249,613 B1 | 6/2001 | Crinon et al. | |
| 6,301,386 B1 | 10/2001 | Zhu et al. | |
| 6,307,885 B1 | 10/2001 | Moon et al. | |
| 6,330,025 B1 | 12/2001 | Arazi et al. | |
| 6,356,664 B1* | 3/2002 | Dunn | G11B 27/031 375/240.08 |
| 6,415,057 B1 | 7/2002 | Suzuki et al. | |
| 6,437,819 B1 | 8/2002 | Loveland | |
| 6,469,737 B1 | 10/2002 | Igarashi et al. | |
| 6,493,022 B1 | 12/2002 | Ho et al. | |
| 6,504,479 B1 | 1/2003 | Lemons et al. | |
| 6,512,793 B1 | 1/2003 | Maeda | |
| 6,542,621 B1 | 4/2003 | Brill et al. | |
| 6,546,120 B1 | 4/2003 | Etoh et al. | |
| 6,560,366 B1 | 5/2003 | Wilkins | |
| 6,563,874 B1 | 5/2003 | Lu | |
| 6,573,907 B1 | 6/2003 | Madrane | |
| 6,591,006 B1 | 7/2003 | Niemann | |
| 6,628,323 B1 | 9/2003 | Wegmann | |
| 6,628,887 B1 | 9/2003 | Rhodes et al. | |
| 6,680,745 B2 | 1/2004 | Center et al. | |
| 6,707,486 B1 | 3/2004 | Millet et al. | |
| 6,724,421 B1 | 4/2004 | Glatt | |
| 6,771,306 B2 | 8/2004 | Trajkovic et al. | |
| 6,798,977 B2 | 9/2004 | Maeda | |
| 6,826,228 B1 | 11/2004 | Hui | |
| 6,879,705 B1 | 4/2005 | Tao et al. | |
| 6,901,110 B1 | 5/2005 | Tsougarakis et al. | |
| 6,940,998 B2 | 9/2005 | Garoutte | |
| 6,950,465 B1* | 9/2005 | Yokoyama | H04N 5/145 348/E5.066 |
| 7,020,335 B1 | 3/2006 | Abousleman | |
| 7,218,756 B2 | 5/2007 | Garoutte | |
| 7,292,264 B2 | 11/2007 | Itokawa | |
| 7,423,669 B2 | 9/2008 | Oya et al. | |
| 7,428,000 B2 | 9/2008 | Cutler | |
| 7,447,337 B2 | 11/2008 | Zhang et al. | |
| 7,469,139 B2 | 12/2008 | van De Groenendaal | |
| 7,525,570 B2 | 4/2009 | Kiely et al. | |
| 7,630,570 B1 | 12/2009 | Haskell et al. | |
| 7,650,058 B1 | 1/2010 | Garoutte | |
| 7,672,524 B2 | 3/2010 | Schwenke et al. | |
| 8,019,170 B2 | 9/2011 | Wang et al. | |
| 8,026,945 B2 | 9/2011 | Garoutte et al. | |
| 8,041,075 B2 | 10/2011 | Lei et al. | |
| 8,279,944 B2 | 10/2012 | Larbier et al. | |
| 8,374,237 B2 | 2/2013 | Demos et al. | |
| 8,587,655 B2 | 11/2013 | Garoutte et al. | |
| 9,215,467 B2 | 12/2015 | Cheok et al. | |
| 2001/0005208 A1 | 6/2001 | Minami et al. | |
| 2001/0043270 A1 | 11/2001 | Lourie et al. | |
| 2001/0046262 A1 | 11/2001 | Freda | |
| 2002/0009141 A1 | 1/2002 | Yamaguchi et al. | |
| 2002/0030741 A1 | 3/2002 | Broemmelsiek | |
| 2002/0140814 A1 | 10/2002 | Cohen-Solal et al. | |
| 2003/0071891 A1 | 4/2003 | Geng | |
| 2003/0081504 A1 | 5/2003 | McCaskill | |
| 2003/0125109 A1 | 7/2003 | Green | |
| 2003/0128298 A1* | 7/2003 | Moon | G06T 7/246 348/578 |
| 2003/0147462 A1 | 8/2003 | Maeda | |
| 2004/0017386 A1 | 1/2004 | Liu et al. | |
| 2004/0022322 A1 | 2/2004 | Dye | |
| 2004/0064838 A1 | 4/2004 | Olesen et al. | |
| 2004/0075738 A1 | 4/2004 | Burke et al. | |
| 2004/0100563 A1 | 5/2004 | Sablak et al. | |
| 2004/0119819 A1 | 6/2004 | Aggarwal et al. | |

(56) References Cited

U.S. PATENT DOCUMENTS

| | | | |
|---|---|---|---|
| 2004/0125207 A1 | 7/2004 | Mittal et al. | |
| 2004/0143602 A1 | 7/2004 | Ruiz et al. | |
| 2004/0161037 A1* | 8/2004 | Skripin | H04N 19/543 375/240.16 |
| 2004/0169587 A1 | 9/2004 | Washington | |
| 2004/0186813 A1 | 9/2004 | Tedesco et al. | |
| 2004/0239776 A1 | 12/2004 | Shinohara et al. | |
| 2004/0244047 A1 | 12/2004 | Shinkai et al. | |
| 2004/0246336 A1 | 12/2004 | Kelly et al. | |
| 2004/0263476 A1 | 12/2004 | Lim et al. | |
| 2004/0263636 A1 | 12/2004 | Cutler et al. | |
| 2005/0007479 A1 | 1/2005 | Ahiska | |
| 2005/0012817 A1 | 1/2005 | Hampapur et al. | |
| 2005/0036036 A1 | 2/2005 | Stevenson et al. | |
| 2005/0086704 A1 | 4/2005 | Rhodes et al. | |
| 2005/0134450 A1 | 6/2005 | Kovach | |
| 2005/0175251 A1* | 8/2005 | Taketa | H04N 19/647 382/248 |
| 2005/0185823 A1 | 8/2005 | Brown et al. | |
| 2006/0136972 A1 | 6/2006 | Metzger et al. | |
| 2006/0140279 A1* | 6/2006 | Murakami | H04N 19/124 375/240.25 |
| 2006/0159308 A1 | 7/2006 | Hampapur et al. | |
| 2006/0165386 A1 | 7/2006 | Garoutte | |
| 2006/0167595 A1 | 7/2006 | Breed et al. | |
| 2006/0195569 A1 | 8/2006 | Barker | |
| 2006/0222078 A1 | 10/2006 | Raveendran | |
| 2007/0035623 A1 | 2/2007 | Garoutte et al. | |
| 2007/0094716 A1 | 4/2007 | Farino | |
| 2007/0110327 A1* | 5/2007 | Han | H04N 19/115 382/251 |
| 2007/0115814 A1 | 5/2007 | Gerla et al. | |
| 2007/0237235 A1 | 10/2007 | Krishnan | |
| 2008/0129844 A1* | 6/2008 | Cusack | H04N 5/232 348/241 |
| 2008/0181507 A1 | 7/2008 | Gope et al. | |
| 2008/0279279 A1 | 11/2008 | Liu et al. | |
| 2009/0087027 A1* | 4/2009 | Eaton | G06F 15/16 382/103 |
| 2009/0110296 A1* | 4/2009 | Sekiguchi | G06F 17/3025 382/218 |
| 2009/0232202 A1 | 9/2009 | Chen et al. | |
| 2009/0232203 A1 | 9/2009 | Jayant et al. | |
| 2010/0124274 A1 | 5/2010 | Cheok et al. | |
| 2010/0165112 A1* | 7/2010 | Scanlon | H04N 19/17 348/169 |
| 2012/0092494 A1 | 4/2012 | Garoutte et al. | |
| 2016/0337647 A1 | 11/2016 | Cheok et al. | |

OTHER PUBLICATIONS

Office Action for U.S. Appl. No. 12/620,232, dated Jan. 5, 2012.
Office Action for U.S. Appl. No. 12/620,232, dated Oct. 19, 2012.
Office Action for U.S. Appl. No. 12/620,232, dated Oct. 2, 2014.
International Search Report and Written Opinion for International Application No. PCT/US2009/064759, dated Feb. 4, 2010.
Office Action for U.S. Appl. No. 14/966,083, dated Aug. 16, 2017, 8 pages.
Office Action for U.S. Appl. No. 10/041,402, dated Mar. 18, 2009.
Office Action for U.S. Appl. No. 10/041,402, dated Sep. 12, 2008.
Office Action for U.S. Appl. No. 10/041,402, dated Jan. 2, 2008.
Office Action for U.S. Appl. No. 10/041,402, filed dated Jul. 18, 2007.
Office Action for U.S. Appl. No. 10/041,402, dated Feb. 23, 2007.
Office Action for U.S. Appl. No. 10/041,402, dated Jul. 17, 2006.
International Search Report for International Application No. PCT/US2003/000475, dated Apr. 29, 2003.
Office Action for U.S. Appl. No. 11/388,505, dated Sep. 12, 2007.
Office Action for U.S. Appl. No. 11/388,505, dated Aug. 14, 2006.
International Search Report and Written Opinion for International Application No. PCT/US2007/007183, dated Feb. 8, 2008.
Office Action for U.S. Appl. No. 11/491,485, dated Jan. 8, 2009.
Office Action for U.S. Appl. No. 11/491,485, filed dated Jul. 8, 2009.
Office Action for U.S. Appl. No. 11/491,485, dated Jul. 21, 2010.
Office Action for U.S. Appl. No. 11/491,485, dated Jan. 20, 2010.
International Search Report and Written Opinion for International Application No. PCT/US2006/028843, dated Sep. 25, 2007.
Office Action for U.S. Appl. No. 13/241,923, dated Jan. 18, 2013.
European Search Report for European Application No. EP 06785424, dated Mar. 18, 2010.
Gibson, L. et al., "Vectorization of raster images using hierarchical methods," Computer Graphics and Image Processing, 20(1):82-89 (1982).
Kuhn, P. M. et al., "MPEG-7 transcoding hints for reduced complexity and improved quality," Proceeding of the International Packet Video Workshop: Kyongju, Korea, pp. 276-285 (2001).
Schmid, C., "Weakly Supervised Learning of Visual Models and Its Application to Content-Based Retrieval," International Journal of Computer Vision, 56(1/2):7-16 (2004).
Wang, Y. F. et al., "A Video Analysis Framework for Soft Biometry Security Surveillance," International Multimedia Conference, Proceedings of the Third ACM International Workshop on Video Surveillance and Sensor Networks, Hilton Singapore (2005) [online]. [Retrieved Jan. 27, 2010]. Retrieved from the Internet: <URL: http://excelsior.cs.ucsb.edu/papers/vssn05.pdf>.

\* cited by examiner

ANALYTICS-MODULATED CODING OF SURVEILLANCE VIDEO

RELATED APPLICATIONS

This application is a divisional application of U.S. patent application Ser. No. 14/966,083, filed Dec. 11, 2015, entitled "Analytics-Modulated Coding of Surveillance Video," which is a continuation of U.S. patent application Ser. No. 12/620,232, filed Nov. 17, 2009, now U.S. Pat. No. 9,215,467, entitled "Analytics-Modulated Coding of Surveillance Video," which claims priority to, and the benefit of U.S. Provisional Patent Application Ser. No. 61/115,427, filed on Nov. 17, 2008, entitled "Analytics-Modulated Coding of Surveillance Video," the disclosures of which are incorporated herein by reference in their entireties.

BACKGROUND

The systems and methods disclosed relate generally to video processing and more particularly to adaptively compressing video based on video analytics.

Surveillance technology has been increasingly used to monitor people, places and activities. For example, high-quality surveillance video is being used to better monitor events and/or to reduce visually distracting artifacts that may interfere with human recognition. As surveillance video data is retained and archived for longer periods of time, large amounts of data storage space are typically needed. In addition, more innovative applications are emerging in which the streaming of video to wireless and mobile devices is used over evermore bandwidth-constrained networks. Such uses are demanding not only new surveillance solutions, but also new or enhanced video compression techniques.

To address the above needs for enhanced compression, it is desirable to have a technique of coding objects in the surveillance scene so that a region-of-interest (ROI) can be compressed at higher quality relative to other regions that are visually less-important such as the scene background, for example. While such techniques have been proposed, they require the use of custom encoders and decoders. The widespread use of video makes the deployment of such devices complicated and expensive; a more desirable solution would be one that permits compressed video streams to be decoded by industry-standard decoders without requiring special plug-ins or customization. It is furthermore desirable to have an encoder that produces bit streams that are compliant with the MPEG-4 or H.264 compression standards. Within these standards, it is also desirable to selectively allocate bits to portions of the scene that are deemed to be important; scene analysis using video analytics (also called "video content analysis") can be a powerful tool for performing this function.

SUMMARY

In one or more embodiments, a method and apparatus for encoding surveillance video where one or more regions of interest are identified and the encoding parameter values associated with those regions are specified in accordance with intermediate outputs of a video analytics process. Such analytics-modulated video compression allows the coding process to adapt dynamically based on the content of the surveillance images. In this manner, the fidelity of the region of interest (ROI) is increased relative to that of a background region such that the coding efficiency is improved, including instances when no target objects appear in the scene. Better compression results can be achieved by assigning different coding priority levels to different types of detected objects. In addition to segmentation, classification and tracking modules can be used as well. Because shape information need not be coded, fewer computational resources and/or fewer bits are necessary. The analytics-modulated video compression approach is not limited to specific profiles, does not require a new shape-based coding profile, and produces a compressed video stream that is compliant with multiple standards. In contrast to other approaches where varying the frame rate and frame size (i.e., temporal and spatial resolution) may result in noticeable discontinuity in perceptual quality, the analytics-modulated video compression approach produces smooth, high-quality video at a low bit rate by adjusting encoding parameters at a finer granularity.

DETAILED DESCRIPTION

Novel techniques can be used for coding objects in a surveillance scene so that a region-of-interest (ROI) can be compressed at higher quality relative to other regions that are visually less-important such as the scene background, for example. A scene without objects can be encoded at a lower bit rate (e.g., higher compression) than a scene with detected objects. A scene with different types of objects as well as regions with different brightness, spatial or temporal activities can have the objects and/or regions encoded at different levels of fidelity. It is desirable that these techniques allow for scaling of various encoding parameter values so as to use fewer bits when appropriate to produce significantly greater compression of the surveillance scene without visual artifacts.

MPEG Video Compression

The Moving Picture Expert Group (MPEG) is a working group of the International Organization for Standardization/International Electrotechnical Commission (ISO/IEC) that develops standards for coded representation of digital audio and video. A benefit of compression is in data rate reduction that lowers transmission and storage cost, and where a fixed transmission capacity is available, results in better video quality. Video signals typically contain a significant amount of redundancy; video samples are typically similar to each other so that one sample can be predicted fairly accurately from another, thereby exploiting the correlation among the samples to reduce the video bit rate. The MPEG standard(s) achieve high compression rates by removing spatial and temporal redundancy.

Figure 1:
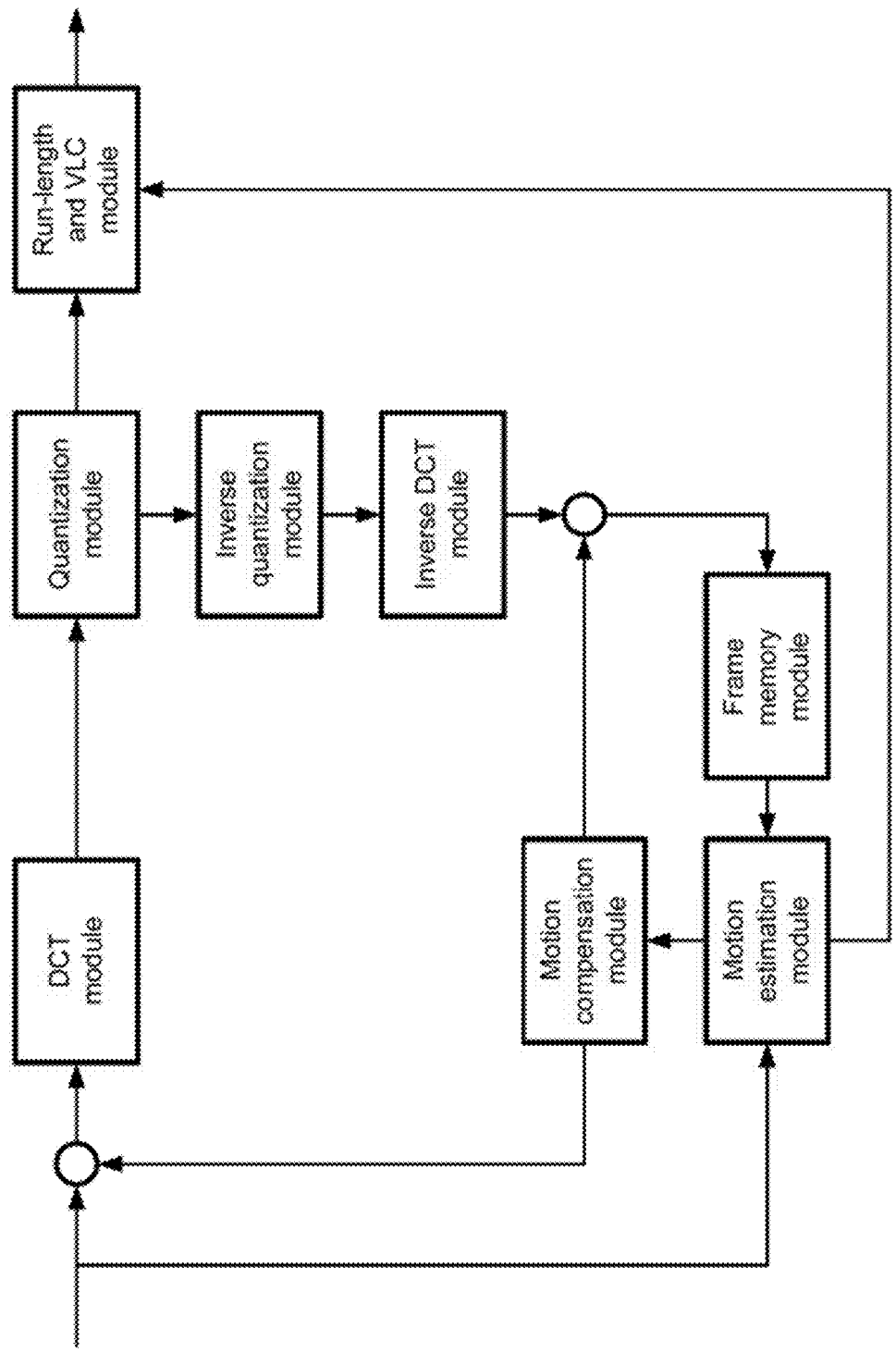
FIG. 1 is a system block diagram of an MPEG encoder architecture.

FIG. 1 is a system block diagram of an MPEG encoder architecture that is configured to compress video signals. The MPEG encoder includes multiple modules. Each module in the MPEG encoder can be software-based (e.g., set of instructions executable at a processor, software code) and/or hardware-based (e.g., circuit system, processor, application-specific integrated circuit (ASIC), field programmable gate array (FPGA)).

To remove spatial redundancy, the MPEG encoder divides a video frame into smaller blocks of pixels that are then operated by a Discrete Cosine Transform (DCT) operation. The DCT operation decorrelates the pixel elements in the spatial domain and converts them to independent frequency domain coefficients. The process is localized, i.e., the encoder samples an 8×8 spatial window to compute the 64 transform coefficients. The DCT coefficients are energy concentrated, i.e., most of the signal energy is concentrated in a few low frequency coefficients such that a few of the coefficients contain most of the information in the frame. For a particular macroblock (e.g., a block of pixels), the DC coefficient that appears as the top left coefficient contains the average energy of the entire signal in that macroblock, while the remaining AC coefficients contain higher frequency information of the macroblock. The DCT coefficients are then adaptively quantized. A quantization operation involves mapping an input signal with a range of values to a reduced range of output values. The quantization operation is generally regarded as the lossy part of video compression. The amount of compression at this stage is typically controlled by a quantization parameter (QP). A high QP value produces fewer bits used (i.e., greater compression) at the expense of reduced image or scene quality. After quantization, most of the high frequency coefficients (e.g., AC coefficients) are reduced to zeros. The quantized DCT coefficients are subjected to run-length coding to generate (run, level) pairs that indicate the number of zero coefficients and the amplitude of the following non-zero coefficient. These (run, level) pairs are then variable-length coded. Variable length coding (VLC) is typically used to further compress the representation of the signal by assigning shorter code words to more frequently occurring symbols (pairs) and longer code words to those that appear less frequently in the sequence.

To take advantage of temporal correlation, instead of a full frame, it is desirable to encode the differences that exist between images. Intra-coded (I) frames, also known as I-frames, contain full frame information that is independent of other frames, while inter-coded frames, often referred to as predictive-coded (P) or bidirectionally-predictive-coded (B) frames, represent or are associated with image differences.

Figure 2:
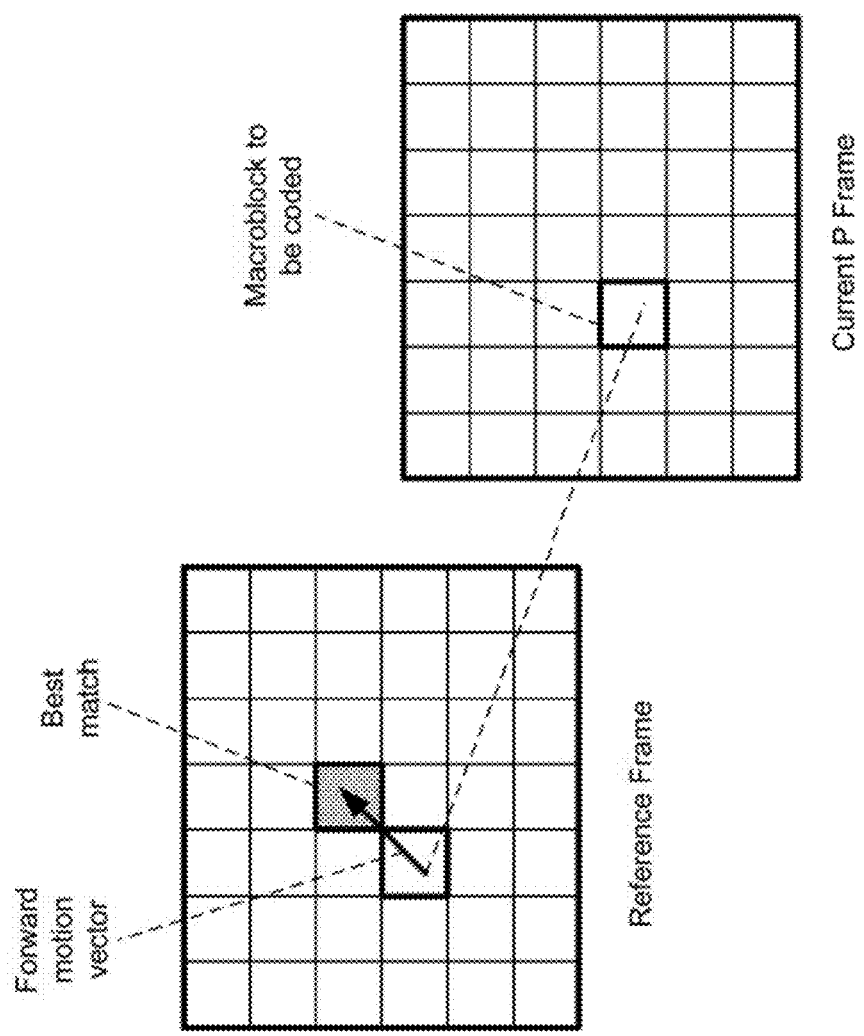
FIG. 2 is a diagram illustrating motion-compensated prediction in a P-frame.
Figure 3:
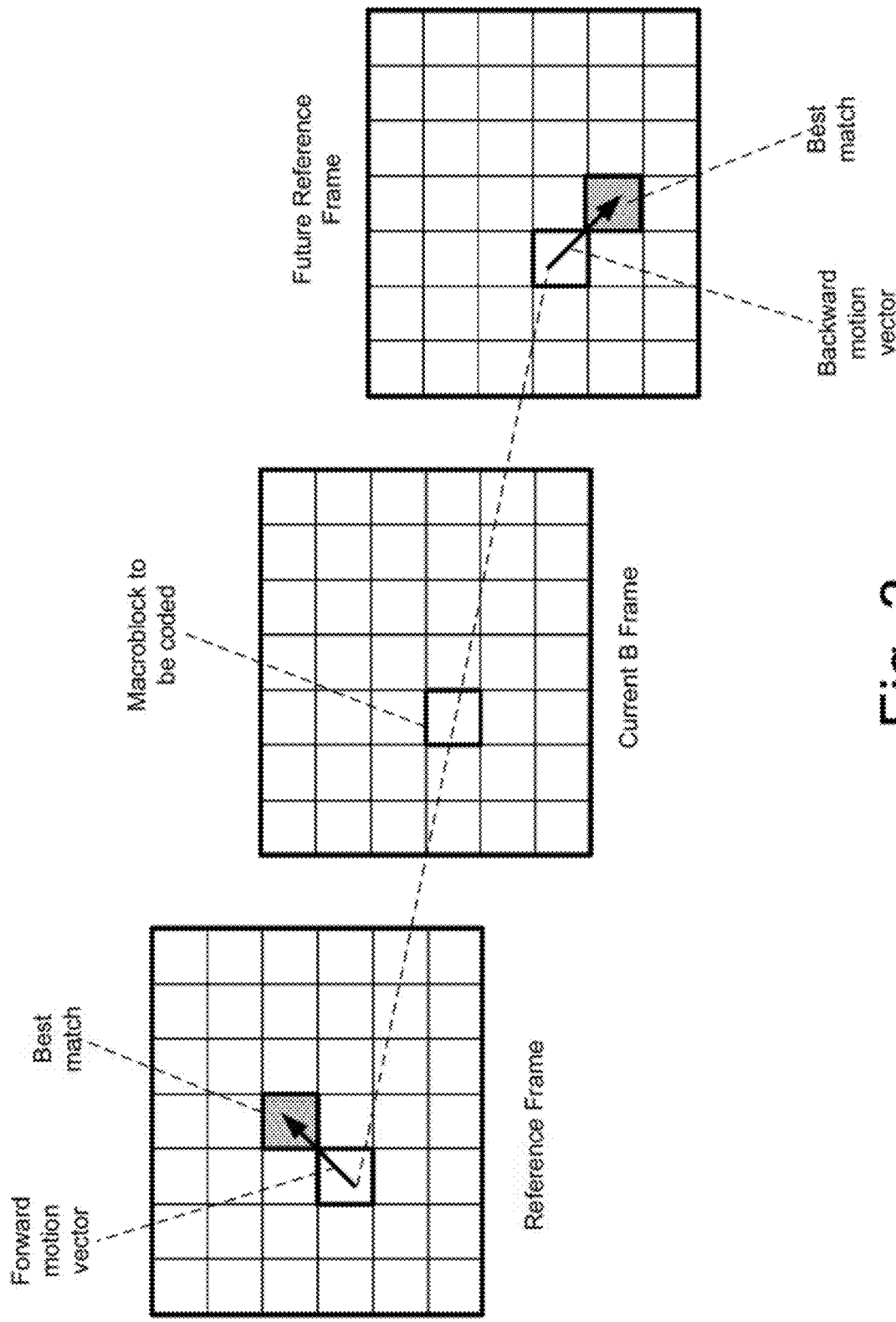
FIG. 3 is a diagram illustrating motion-compensated bidirectional prediction in a B-frame.

FIGS. 2-3 are each a diagram illustrating motion-compensated prediction in a P-frame and a B-frame respectively. FIG. 2 shows a P-frame being predicted from a previously encoded I or P-frame (reference frame). FIG. 3 shows a B-frame being predicted from both a previous reference (I or P) frame, and a future reference (I or P) frame in both backward and forward directions, respectively. The predictive coding process of inter-coded frames typically involves producing or generating motion vectors. Motion estimation involves searching for a macroblock (e.g., a 16×16 block of pixels) in the reference frame that best matches the current block in the current frame. The residual energy that reflects the difference between the blocks is then quantized and entropy-coded. The displacement between the two blocks is represented by a motion vector (MV). The difference between this MV and that of a predicted block is then coded and transmitted as part of the compressed video stream.

Video Compression Standards

MPEG-1 and MPEG-2 are Emmy Award winning standards that made interactive video on CD-ROM and Digital Television possible. The MPEG-1 standard was originally used for digital storage media such as video compact discs (CD) and supports interactivity such as fast forward, fast reverse and random access into stored bitstreams. The MPEG-2 standard, on the other hand, is the format typically used for DVD and HDTV and for broadcast applications. The MPEG-2 standard includes multiplexing schemes for carrying multiple programs in a single stream, as well as mechanisms that offer robustness when delivering compressed video and audio over error prone channels such as coaxial cable television networks and satellite transponders, for example. The MPEG-4 standard was originally developed for low bit-rate video communications devices and provides higher compression than its predecessors. The MPEG-4 standard later evolved to include means for coding arbitrarily shaped natural and synthetic objects characterized by shape, texture and motion, in addition to frame-based video. The standard also enables interactivity, managing and synchronizing of multiple objects in a multimedia presentation.

One of the latest compression standards is H.264, which is jointly developed by the International Telecommunications Union (ITU) Video Coding Expert Group (VCEG) and ISO/IEC MPEG to address increasing needs for higher compression. Built on the concepts of earlier standards such as MPEG-2 and MPEG-4 Visual, the H.264 standard offers significant improvements in video quality and is currently the standard of choice for the video format for Blu-Ray disc, HDTV services, and mobile applications, for example. The H.264 standard is capable of delivering the same high-quality video with savings of between 25% and 50% on bandwidth and storage requirements compared to its predecessors. Some of the enhanced encoding features of the H.264 standard include techniques for reducing artifacts that may appear around the boundary of the macroblocks (i.e., reduce "blockiness"), adaptive decomposition of the block into various smaller block sizes for regions with finer spatial details, sampling at less than one integer pixel for higher accuracy, use of integer transform, and improved VLC techniques that may use a fractional number (instead of a series of bits) to represent the data symbol. The VLC techniques are typically based on context information (i.e., prior knowledge of how the previous pixels or symbols were encoded).

Video Analytics

Video analytics, also known as Video Content Analysis (VCA) or intelligent video, refers to the extraction of meaningful and relevant information from digital video. Video analytics builds upon research in computer vision, pattern analysis and machine intelligence. For example, video analytics uses computer vision algorithms that allow a system to perceive (e.g., "see") information associated with the video, and then uses machine intelligence to interpret, learn, and/or draw inferences from the information perceived. One aspect of video analytics is scene understanding, that is, understand the context around an object in the video. Other aspects of video analytics include the detection of motion and tracking an object through the scene. For example, smart cameras that include or provide video analytics can be used to detect the presence of people and detect suspicious activities such as loitering or motion into an unauthorized area.

Figure 4:
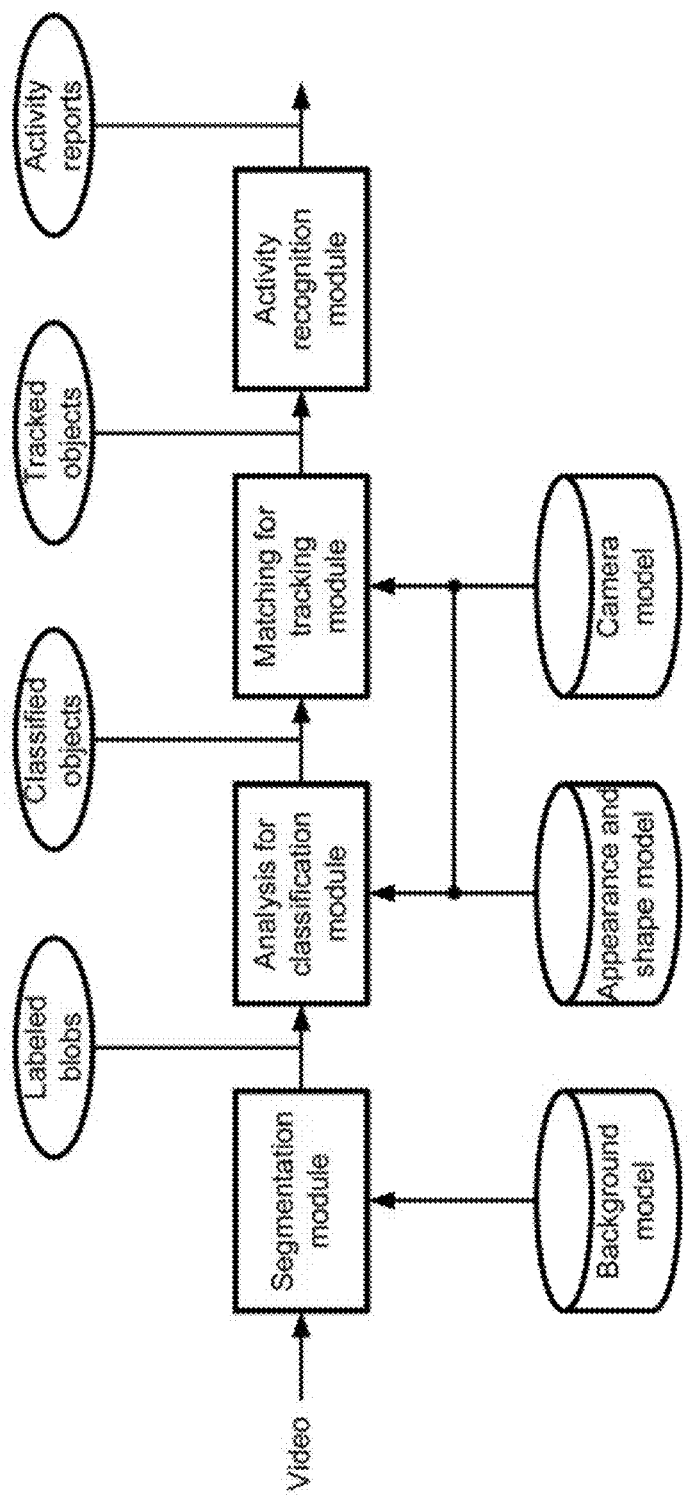
FIG. 4 is a block diagram illustrating a video analytics processing pipeline, according to an embodiment.

FIG. 4 is a block diagram illustrating a video analytics processing pipeline, according to an embodiment. The video analytics processing pipeline consists of a chain of processing blocks or modules including segmentation, classification, tracking, and activity recognition. Each module can be software-based, or software-based and hardware-based. It is desirable for the video analytics processing pipeline to detect changes that occur over successive frames of video, qualify these changes in each frame, correlate qualified changes over multiple frames, and interpret these correlated changes.

The segmentation module is configured to identify foreground blobs (i.e., associated pixel clusters) using one of multiple segmentation techniques. A segmentation technique can use a background subtraction operation to subtract a current frame from a background model. The background model is initialized and then updated over time, and is used by the background subtraction operation to detect changes and identify foreground pixels. In one embodiment, the background model can be constructed using a first frame or the mean image over N frames. In one embodiment, a terrain map can be used to separate the foreground from the background in a frame. An example of using a terrain map is described in U.S. Pat. No. 6,940,998, entitled "System for Automated Screening of Security Cameras," which is hereby incorporated herein by reference in its entirety. To produce an accurate background model, it is desirable to account for changes in illumination and/or changes that result from foreground blobs becoming part of the background. The background model adapts to these changes and continues to update the background.

Figure 5:
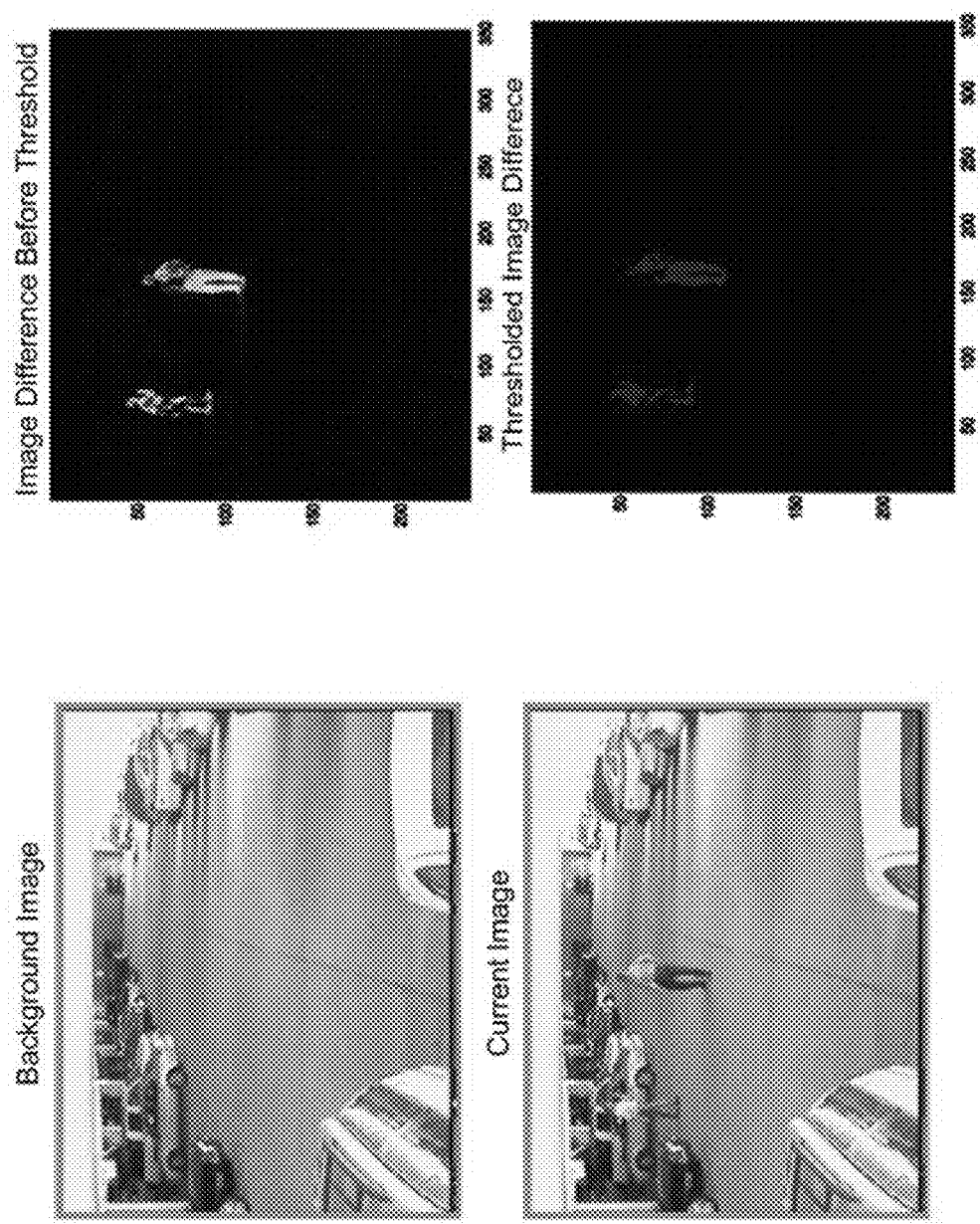
FIG. 5 illustrates the use of difference image thresholding to obtain foreground pixels, according to an embodiment.

FIG. 5 illustrates the use of difference image thresholding to obtain foreground pixels, according to an embodiment. A low threshold value can allow smaller changes to be qualified as foreground pixels, resulting in clutter because of sensor noise, moving foliage, rain or snow, illumination changes, shadows, glare, and reflections, for example. Simple motion detection does not adequately remove clutter and will cause false detections. A high threshold value can result in holes and gaps that can be filled using a morphological filter. The threshold value and the frequency at which the background is updated can impact the results of the segmentation technique. Other embodiments may use adaptive thresholding or gain control, and can be configured such that, for example, the gain is controlled by area of the image. An example of area-based gain control is described in U.S. Pat. No. 7,218,756, entitled "Video Analysis Using Segmentation Gain by Area," which is hereby incorporated herein by reference in its entirety.

During segmentation, each connected blob is uniquely labeled to produce foreground blobs. Blob labeling can be done by recursively visiting all foreground neighbors of a foreground pixel and labeling them until no unvisited neighbor is available. Such segmentation yields fine pixel-level separation between foreground and background as opposed to techniques that use macro-block level motion estimation for this purpose.

Once the image is segmented, the blobs are classified by, for example, assigning a category to each foreground blob. Classification uses image features to discriminate one class from another. For example, classification produces the likelihood of an object belonging to a certain given class. Binary classifiers are used to separate object blobs into one of two classes (e.g., object is a person or a non-person). Multi-class classifiers separate object blobs into one of multiple classes (e.g., object is a person, a vehicle, or an animal).

Figure 6:
FIG. 6 illustrates a classifier discriminating between a person and a car, according to an embodiment.

FIG. 6 illustrates a classifier discriminating between a person and a car, according to an embodiment. A simple classifier that separates persons from vehicles can be constructed by, for example, examining the aspect ratio of the segmented blob. People tend to be taller than wide, while cars are wider than tall. Other features that can be useful for classification are histograms and outlines. FIG. 6 shows two foreground blobs, one classified as a person and the other classified as a car. Other embodiments can use machine learning to classify a test blob after being trained by using positive and negative blob examples.

Classified objects can be tracked across multiple video frames by establishing a correspondence or association between objects (e.g., blobs) in different video frames. These correspondences can be used for scene interpretation and for behavior or activity recognition. Because an object may change its pose or orientation with respect to the camera, that object may look different over multiple frames. Furthermore, people moving in a scene exhibit articulated motion, which can substantially change the shape of the blob. During tracking it is desirable to be able to identify invariant features or situations when objects occlude each other. For example, it is desirable to handle a situation wherein a person walks behind a tree and re-appears or when the parts of an articulated object occlude one another, such as when swinging arms occlude the torso of a walking person.

Once foreground objects have been segmented, classified, and/or tracked, their motion and behavior can be analyzed and described. Examples of activities in which such analysis and description can be performed include a loitering person, a fallen person or a slow-moving vehicle. In addition, body parts can also be analyzed to provide information on human activities such as jumping, crouching, reaching, and bending, for example. Gesture recognition techniques can also be used to identify activities such as grasping, pointing and waving.

In some embodiments, surveillance images are encoded for transmission or storage by leveraging the intermediate outputs of video analytics (e.g., outputs from segmentation, classification, tacking, and/or activity recognition) to achieve better coding efficiency. In traditional coding methods, the encoding parameters are typically fixed over an entire frame or over an entire sequence of frames. One aspect of the video compression described herein is to use the intermediate outputs of the video analytics processing pipeline described above with respect to FIG. 4 to produce analytics-modulated coding, also called scene-adaptive video coding. For example, a region-of-interest (ROI) can be identified and one or more encoding parameters, including the QP values, can be varied, adjusted, or modified during the coding process to adapt the coding process based on the content of the surveillance scene. Such adaptation can be based on changes that occur when, for example, an object (or different types of objects) enters or leaves a scene, or when the brightness, spatial, and/or temporal activity associated with an object changes. Scene semantics based on activity recognition can also be used to adapt the coding process. For example, activity recognition in surveillance video can detect a loitering person. The series of frames corresponding to the loitering activity can be coded at a higher fidelity compared to other frames. Analytics-modulated coding differs, at least in part, from other schemes that update the frame-rate, resolution, or overall compression bit rate (which applies to the whole frame) by applying finer level control at each aspect of the coding process, at a much higher spatial and temporal granularity. This approach provides greater compression at the same quality level, and does not cause objectionable jumps in the frame that may result from a sudden change in full-frame resolution and/or quality.

While the current MPEG-4 standard handles a video sequence as a composition of one or more objects of arbitrary shape (e.g., ROI), the shape information, in addition to the image data, are encoded and transmitted as part of the video stream. Such an approach can result in added computational burden and can require more memory and bandwidth resources. The H.264 standard offers better compression than the MPEG-4 standard. However, one functionality that is absent in the H.264/Advanced Video Coding (AVC) standard is the ability to code arbitrary shaped objects. Some recent work done in this area has resulted in progress in incorporating shape-coding functionality in the H.264/AVC standard. For example, certain proposed techniques encode the shape information and use a non-standard-based player/decoder, while other proposed techniques support certain profiles of the H.264/AVC standard, or limit the use of specific frame types or encoding parameters. None of this recent work, however, fully exploits the use of other encoding parameters and/or the outputs produced by the video analytics modules such as object class, track history and activity recognition In some embodiments, several video analytics modules including segmentation, classification, and tracking, for example, are used for scene-adaptive video coding. Based on analytics output, the encoding parameters can be varied during the coding process to adapt to the content of the scene. When coding ROIs the shape information of each ROI need not be coded and the coding operation need not be limited to specific profiles. Furthermore, the analytics-modulated coding approach described herein produces an encoded video stream decodable by players that do not support shape-based coding.

Figure 7:
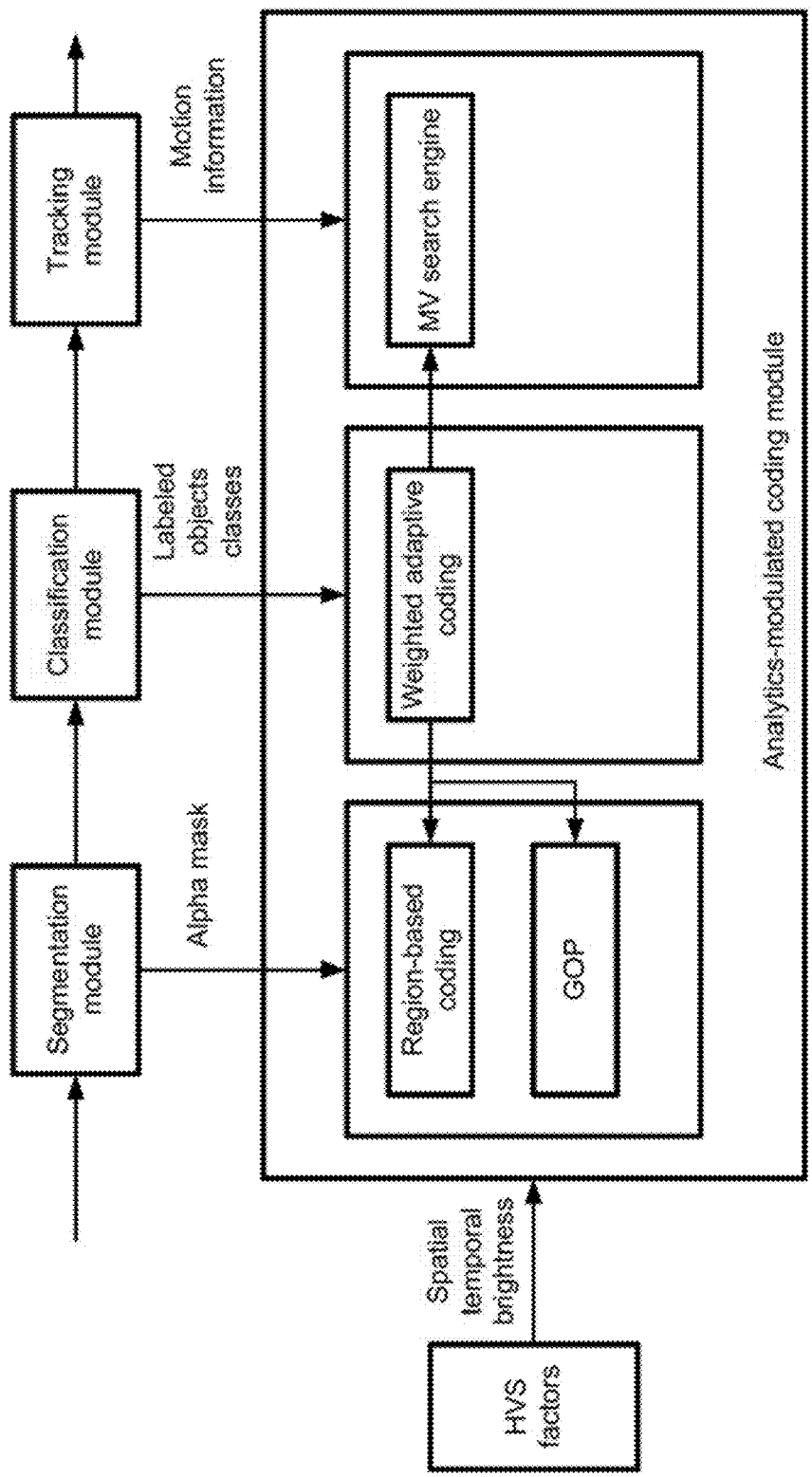
FIG. 7 is a system block diagram of video analytics and coding modules used in scene-adaptive video coding, according to an embodiment.

FIG. 7 is a system block diagram of video analytics and coding modules used in scene-adaptive video coding, according to an embodiment. A foreground alpha mask generated by the segmentation module is used to identify regions of interest (ROI) for region-based coding, as well as to adjust encoding parameters in the coding modules such as the Group-of-Pictures (GOP) size and/or the QP. The GOP is a group of successive video frames and defines the arrangement or organization of the I, P, and/or B-frames. The GOP includes an I-frame, followed by a series of P and/or B-frames. The GOP size is the number of frames between two I-frames. The QP is a parameter used in the quantization process and is associated with the amount of compression. The value of the QP influences the perceived quality of the compressed images.

The segmented objects are classified as assigned to or belonging to 1 of N classes of objects through the classification process. Weights are assigned to each of the classes to define relative priorities among the classes. These weights determine the relative priorities for bit allocation. For example, blobs belonging to one class (e.g., person class), using a greater fraction of the bit budget compared to blobs belonging to another class (e.g., trees class). In some embodiments, two or more classes may have the same weights. In other embodiments, each of the classes may have a unique weight. The classified objects are tracked over multiple frames by establishing a correspondence or association between blobs in the frames. The tracking module produces motion information that can be utilized to determine a suitable motion vector search range. The motion vector search range determines a search window during the Motion Estimation and Compensation (ME/MC) process. The search window is used to search for a group or block of pixels (e.g., a macroblock) in the reference frame that best matches a group or block of pixels being considered in the current frame during the ME/MC process. In this manner, temporal redundancies are used such that, in some instances, only the difference between consecutive frames is encoded.

Region Based Coding by Varying QP

Figure 8:
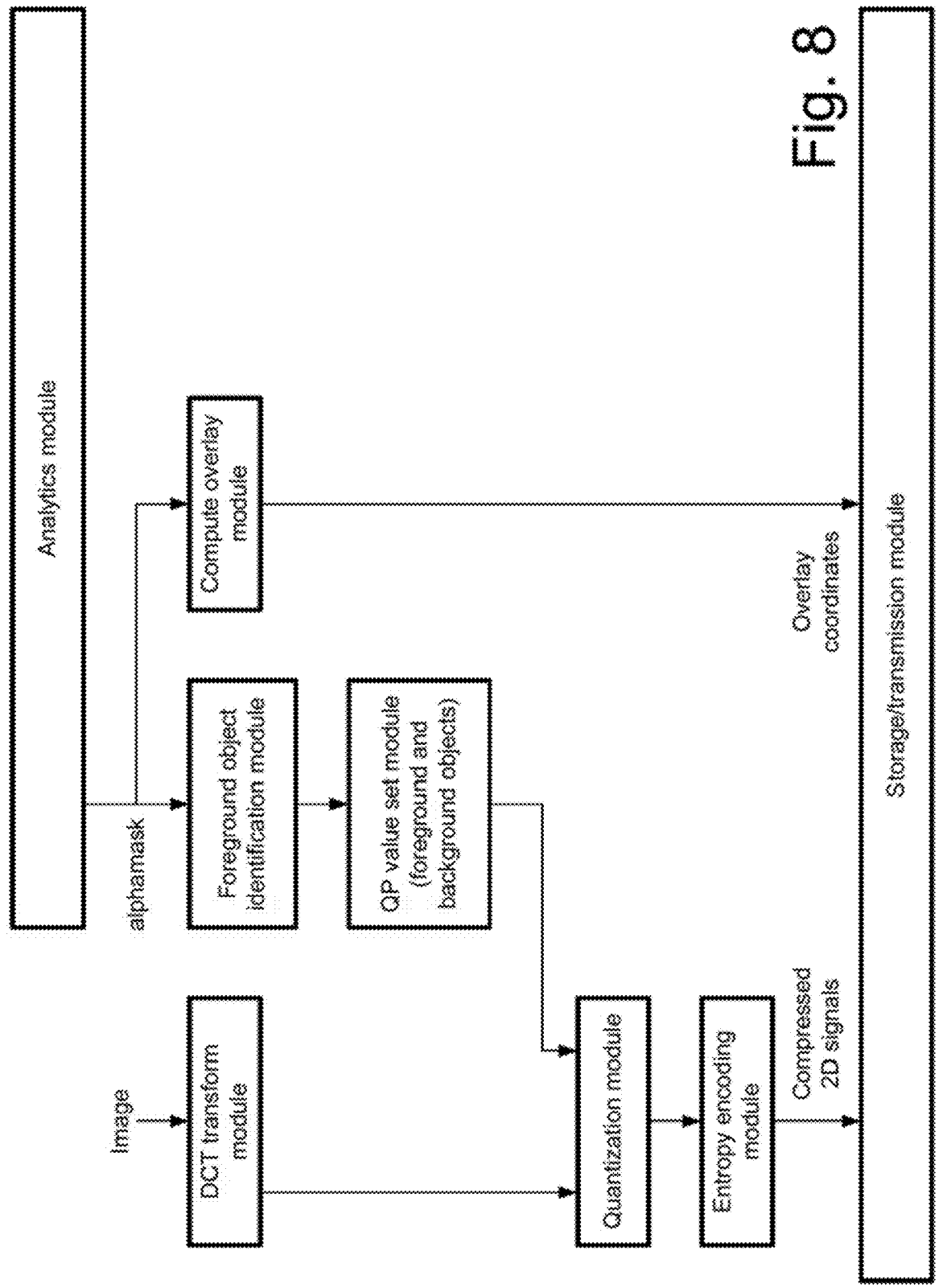
FIG. 8 is a system block diagram of region-based coding by varying quantization parameter (QP), according to an embodiment.

FIG. 8 is a system block diagram of region-based coding by varying QP, according to an embodiment. The video compression process involves first transforming the image from spatial to frequency domain, employing a transformation such as a DCT or integer transform. The transformed coefficients are then quantized based on the QP, and entropy coded to produce the compressed 2-D signals. As described above, quantization is the process of mapping a range of input values to a smaller range of output values and is the lossy compression part of video coding. The value of the QP is used to specify the extent of compression that is desired. For example, a larger QP value uses fewer bits to code, resulting in more compression and reduced image quality. In another example, a smaller QP value can produce better quality images at lower compression. The alpha mask serves as input to a module to compute and derive the coordinates for overlays, which are geometric shapes used for bounding the detected targets. These overlays are often useful in surveillance video to draw attention to objects or activities of interest. The alpha mask is used to distinguish foreground objects from background objects. A higher QP value can then be used to encode the background object while a lower QP value can be used to encode the foreground object in such a way that the overall bitrate is reduced without compromising quality. Such analytics-modulated coding (AMC) is applicable, in general, to any standard that is based on block-based video coding scheme, including the H.264 standard where integer and Hadamard transforms are used. As previously discussed, DCT is the fundamental transformation utilized in most video coding standards such as the MPEG and H.26x standards.

Figure 13:
FIG. 13 shows various scenes used to illustrate analytics-modulated coding, according to other embodiments.
Figure 13:
Figure 13:
Figure 13:
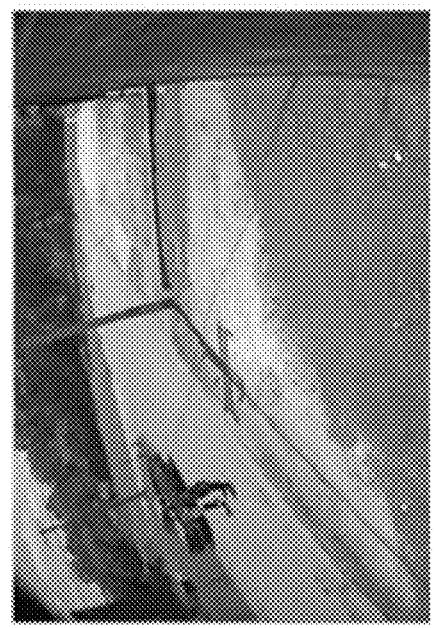

Tables 1-4 present experimental results associated with FIG. 13. These results were obtained by encoding several 2-hr long video clips using different combinations of QP values for foreground objects and background objects. The video clips (a frame of each is shown in FIG. 13) contain both indoor and outdoor surveillance scenes with different levels of motion activity. A Joint Model (JM) codec is used as a baseline for comparison. JM is the reference software implementation of the H.264 codec adopted by the Joint Video Team (JVT) of the International Organization for Standardization/International Electrotechnical Commission (ISO/IEC) Motion Picture Experts Group (MPEG) and the International Telecommunication Union (ITU-T) Video Coding Experts Group (VCEG) standards committees.

The tables illustrate the bit rate and the Structural Similarity Index (SSIM) for JM and AMC-encoded video using various sets of QP values ranging from 24 to 31, as well as the percentage bit rate savings. SSIM values are used instead of Peak Signal-to-Noise Ratio (PSNR) values because SSIM better correlates to subjective quality. In Table 1, video (the lobby scene in FIG. 13) is encoded using JM with a QP value of 24. The resulting bitrate is 111.72 kbps and the corresponding SSIM value is 0.98. The same video is encoded using AMC with a higher QP value for the background and a lower QP value for the foreground. As shown in Table 1, the video is encoded using AMC with QP values of 24 for the foreground and 25 for the background to derive the same SSIM value (0.98) as the JM encoded video with a QP value of 24. The resulting bitrate is 91.61 kbps, giving a bitrate savings of 18% when AMC is used instead of JM. Tables 2-4 illustrate the results for the other scenes shown in FIG. 13. The highest bitrate savings is achieved when video encoded using AMC with a foreground QP value of 28 and a background QP value of 29 (see e.g., Table 1) or a foreground QP value of 27 and a background QP value of 29 (see e.g., Table 2) is compared to video encoded using JM with a QP value of 28. Using these QP values, Region-based Coding by Varying QP provides performance/compression gains between 13% and 26.5% for the scenes shown in FIG. 13.

TABLE 1

Lobby

| JM QP | JM Bitrate | JM SSIM | AMC QP | AMC Bitrate | AMC SSIM | Bitrate Savings (%) |
|---|---|---|---|---|---|---|
| 24 | 111.72 | 0.98 | 24, 25 | 91.61 | 0.98 | 18 |
| 26 | 65.81 | 0.98 | 26, 27 | 51.45 | 0.98 | 21.8 |
| 28 | 37 | 0.97 | 28, 29 | 27.21 | 0.97 | 26.5 |
| 30 | 25.56 | 0.96 | 30, 31 | 20.65 | 0.96 | 19 |

TABLE 2

Scene with car parked

| JM QP | JM Bitrate | JM SSIM | AMC QP | AMC Bitrate | AMC SSIM | Bitrate Savings (%) |
|---|---|---|---|---|---|---|
| 24 | 54.14 | 0.96 | 24, 25 | 45.73 | 0.96 | 14.8 |
| 26 | 37.72 | 0.94 | 25, 27 | 31.94 | 0.94 | 15 |
| 28 | 25.26 | 0.93 | 27, 29 | 21.99 | 0.93 | 13 |
| 30 | 19.19 | 0.91 | 29, 31 | 17.66 | 0.91 | 8 |

TABLE 3

Entrance of building

| JM QP | JM Bitrate | JM SSIM | AMC QP | AMC Bitrate | AMC SSIM | Bitrate Savings (%) |
|---|---|---|---|---|---|---|
| 24 | 276.64 | 0.98 | 23, 25 | 224.84 | 0.98 | 18.7 |
| 26 | 150.3 | 0.97 | 25, 27 | 118.65 | 0.97 | 21 |
| 28 | 84.2 | 0.96 | 27, 29 | 64.35 | 0.96 | 24 |
| 30 | 56.92 | 0.94 | 29, 31 | 46.47 | 0.94 | 18.4 |

TABLE 4

Trailer

| JM QP | JM Bitrate | JM SSIM | AMC QP | AMC Bitrate | AMC SSIM | Bitrate Savings (%) |
|---|---|---|---|---|---|---|
| 24 | 84.21 | 0.98 | 24, 25 | 64.34 | 0.98 | 23 |
| 26 | 55.01 | 0.98 | 26, 27 | 43.13 | 0.98 | 21.5 |
| 28 | 31.33 | 0.97 | 28, 29 | 23.85 | 0.97 | 23 |
| 30 | 25.92 | 0.97 | 30, 31 | 22.57 | 0.97 | 13 |

Region Based Coding Incorporating Rate Control (RC)

Figure 9:
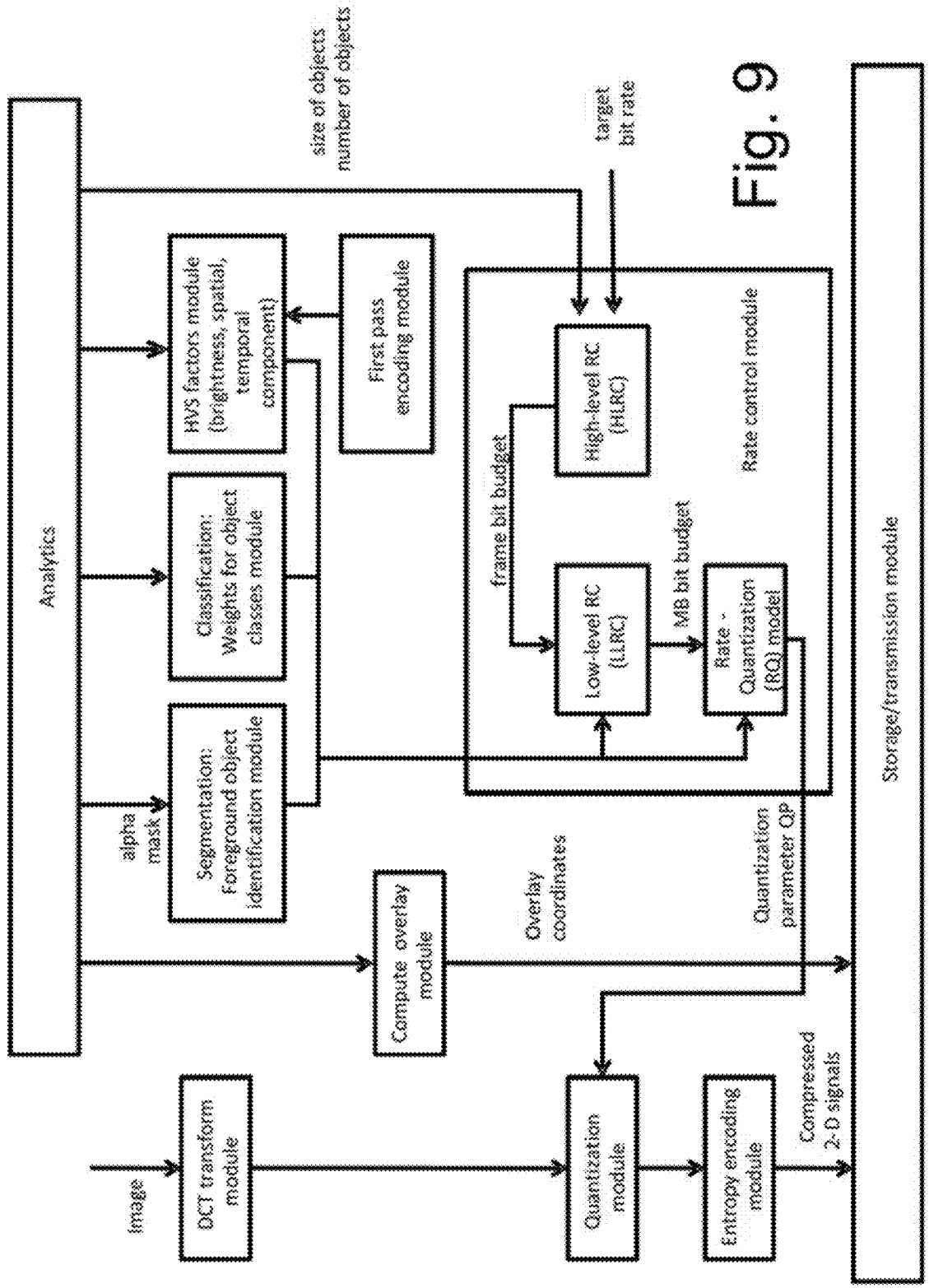
FIG. 9 is a system block diagram of a region-based coding incorporating rate control (RC), according to an embodiment.

FIG. 9 is a block diagram of a system using region-based coding incorporating rate control (RC), according to an embodiment. The RC process of video encoding involves adjusting the QP value to meet a target or predetermined bit rate. The RC module can be composed of a high-level RC (HLRC) component and a low-level RC (LLRC) component. At the HLRC, a bit budget is computed for each frame, given the target bitrate. This frame bit budget serves as input to the LLRC where a bit budget is then computed for each macroblock (MB bit budget), taking into consideration several features from a number of external modules. The corresponding quantization parameter, QP, is then derived from the Rate-Quantization (RQ) model and used by the quantization module for video compression.

At the HLRC, target bit allocation for each frame can be dependent on the number of remaining frames in the GOP, number of remaining bits available for the GOP as well as scene complexity. Scene complexity can be expressed as a function of the number, the size and the type of objects in the scene. These three quantities can be derived from the analytics module. According to an embodiment, the mathematical formulations for calculating frame budget at the HLRC, while incorporating analytics are as follows:

$$T_i = \frac{X_i}{((N-i+1)X_i)+c}\left(R_t - \sum_{j=1}^{i-1} R_j\right) \quad (1)$$

where $$X_i = \sum_{k=1}^{n} \alpha_{k,i} F_{k,i} \quad (2)$$

$$F_{k,i} \in \{a_i, b_i\}$$

and $$a_i = \frac{\sum_{g=1}^{m_i} S_{g,i}}{S}, \quad b_i = \frac{m_i}{M} \quad (3)$$

For a GOP with N frames, the bit budget for frame i, $T_i$, is computed by taking a proportion of bits remaining in the GOP as shown in equation (1). $R_t$ refers to the total bit budget whereas $$\sum_{j=1}^{i-1} R_j$$

gives total bits used to encode frame 1 up to the previous frame i−1 and c is a constant. The proportion is based on complexity, $X_t$, due to multiple features. For example, 2 features are used in equations (2) and (3): normalized size of objects, $a_t$, and normalized number of objects, $b_t$, the scene. $\alpha_{k,i}$ is the weight associated with $F_{k,i}$ which denotes feature k of frame i. In equation (3), $s_{g,i}$ refers to the size of object g (in pixels) in frame i; $m_i$ is the number of objects in frame i, while S and M are the total number of pixels in the video frame and the expected maximum number of objects respectively.

Substituting (2) into (1) gives:

$$T_i = \frac{\sum_{k=1}^{n} \alpha_{k,i} F_{k,i}}{\left((N-i+1)\left(\sum_{k=1}^{n} \alpha_{k,i} F_{k,i}\right)\right) + c} \left(R_t - \sum_{j=1}^{i} R_j\right) \quad (4)$$

And finally:

$$T_{i\_final} = \gamma * TB_i + (1-\gamma) * T_i \quad (5)$$

Where $$TB_i = \frac{R_t}{N} - \Delta p \quad (6)$$

The final target bit budget, $T_{i\_final}$, is allocated for each frame as shown in equation (5). $T_{i\_final}$ is the weighted sum of the bit budget computed based on buffer occupancy, $TB_i$, and the bit budget predicted based on complexity as derived from equation (4), $T_i$. $\gamma$ indicates how much to weight each component ($TB_i$ and $T_i$) of the sum. There are numerous known techniques to compute buffer occupancy. In some embodiments, for example, $TB_i$ can be derived by subtracting delta bits, $\Delta p$, from bits per frame, $$\frac{R_t}{N},$$

as shown in equation (6).

At the LLRC, target bit allocation for each macroblock can be computed as a fraction of bit budget for the frame that includes the macroblock. The bit allocation for the macroblock can be dependent on the macroblock complexity. Analytics can be used to calculate the macroblock complexity using the segmentation and/or classification results, in addition to the Human Visual System (HVS) factors. The mathematical formulation is shown below:

$$r_j = \frac{x_j}{\sum_{j=1}^{p} x_j} T_{i\_final} \quad (7)$$

$$x_j = \sum_{k=1}^{n} \lambda_{k,j} f_{k,j}, \; f_{k,j} \in \{c_j, d_j, e_j, h_j\} \quad (8)$$

$$c_j = (1 - g_j) 1 / S_j \quad (9)$$

$$d_j = (1 - g_j) 1 / M_j \quad (10)$$

$$e_j = (1 - g_j) 1 / I_j \quad (11)$$

$$h_j = g_j w_j, \; g_j = \begin{cases} 1, & \text{if foreground } MB \\ 0, & \text{if background } MB \end{cases} \quad (12)$$

The bit budget for each macroblock, $r_j$, can be derived as a fraction of frame bit budget, $T_{i\_final}$, based on the macroblock complexity, $x_j$, as shown in equation (7) where p is the total number of macroblocks in each frame. $x_j$ is expressed as a weighted linear combination of features $f_{k,j}$, where $f_{k,j} \in \{c_j, d_j, e_j, h_j\}$ and $\lambda_{k,j}$ are weights associated with each of these features (equation (8)). These features include HVS factors such as brightness, spatial activities and temporal activities, denoted as normalized quantities $I_j$, $S_j$ and $M_j$ respectively (equations (9)-(11)). Using $h_j$, analytics are incorporated into the calculation of the macroblock complexity. $g_j$, in equation (12), indicates whether the macroblock belongs to the foreground or background object and is derived based on the segmentation module shown in FIG. 9. According to an embodiment, the pixel boundary of the foreground object is divided by the size of the macroblock and rounded down to the nearest integer for mapping to a macroblock unit. Each macroblock has a width and height of 16 pixels. The classification module in FIG. 9 is used to compute the normalized weight for each object class, $w_j$, $j \in \{1, \ldots, L\}$, where L is the number of object classes. For example, a larger weight can be assigned to a PERSON object and a smaller weight can be assigned to a CAR/VEHICLE object and/or other objects in an application used to detect target persons in the scene. This directly incorporates weights based on object class into the rate control technique used for compression.

A corresponding normalized quantity can be computed by multiplication with a normalization constant, e.g., normalized spatial activity $S_j = C_m * s_j$, where the normalization constant is determined by the following expression:

$$C_m = \frac{1}{\sum_{j=1}^{p} S_j} \quad (13)$$

Because the human eye is less sensitive to distortion in regions that are bright, in regions that include many spatial details, or in regions where there is motion, fewer bits are allocated to these regions so that more bits are available to code the foreground region. The HVS factors are typically produced from a first pass encoding of the video image using a low complexity encoder as shown in FIG. 9. The HVS factors can be derived from analytics and incorporated during encoding an image during the first single pass through the image (e.g., a single scan of the pixel values). These factors can be obtained from the gradient information. For example, the gradient information can be obtained from a degree of slope parameter and a direction of slope parameter as described in U.S. Pat. No. 6,940,998, entitled "System for Automated Screening of Security Cameras," which is hereby incorporated herein by reference in its entirety.

The Rate-Quantization (RQ) model defines the relationship between the bitrate, QP, and complexity. The mathematical formulation is shown below:

$$r_j = K_1 * \frac{x_j}{QP} + K_2 * \frac{x_j}{QP^2} \quad (14)$$

The bit budget for macroblock j, $r_j$, and the macroblock complexity, $x_j$, are derived from equation (7) and equation (8) respectively. $K_1$ and $K_2$ are model parameters. In contrast to schemes that use a Mean Absolute Difference (MAD) between pixels in an original image and pixels in a predicted image, in some embodiments, a combination of segmentation and classification results from analytics can be used, as well as HVS factors to compute macroblock complexity as shown in equations (8)-(12). From the RQ model, a QP value for the macroblock can be derived and used in the quantization module for video compression.

GOP Size and Structure: Adaptive I-Frame Placement

The GOP is a group of pictures within an MPEG-coded video stream. A GOP structure determines the arrangement of I, P and/or B-frames. An I-frame contains I macroblocks (MBs), each MB being intra-coded and can be based on prediction from previously coded blocks within the same frame. An I-frame can be inserted whenever a scene change occurs. In scene-adaptive video coding for surveillance applications, for example, this can happen whenever an object enters or leaves the scene or when the scene changes. In one embodiment, a scheme can be implemented to adaptively change the GOP size and structure depending on the content and/or scene (i.e., content/scene-adaptive). A maximum GOP size can also be specified such that an I-frame can be inserted when the period of inactivity exceeds a certain predetermined duration or a predetermined criterion (e.g., number of frames of inactivity). A minimum GOP size can be specified such that no two I-frames are more than a certain duration apart. Thus, instead of having a fixed GOP structure and size (e.g. IPPPIPPP . . . ), the structure can adaptively change based on recognition of activity in the scene and on the number and class of objects in the scene. This allows placement of P-frames up to the moment that an object enters the scene, or an object of a specific class enters the scene or a significant scene change is detected by the analytics.

Tables 5-7 describe results from experiments conducted on the surveillance scenes shown in FIG. 13, with low and high activity, using a minimum GOP size of 60 or 250 and a maximum GOP size of 60, 250, 1000 or 5000. Using a minimum GOP size of 250 and a maximum GOP size of 1000, the bitrate savings varies from 10% to 19% depending on the scene content. Using a minimum GOP size of 250 and a maximum GOP size of 5000, the bitrate savings varies from 11% to 24% due to the larger maximum GOP size. Using a minimum GOP size of 60, the performance gain is 39% to 52% using a maximum GOP size of 1000, and 40% to 55% using a maximum GOP size of 5000. The bitrate savings is higher for a scene with low activity since there are relatively fewer objects entering and leaving the scene. This results in fewer I-frames.

TABLE 5

Entrance of building

| min GOP size | max GOP size | bitrate | bitrate savings |
| --- | --- | --- | --- |
| 250 | 250 | 84.76 | |
| 250 | 1000 | 76.68 | 10 |
| 250 | 5000 | 75.4 | 11 |
| 60 | 60 | 132.04 | |
| 60 | 1000 | 80.44 | 39 |
| 60 | 5000 | 79.17 | 40 |

TABLE 6

Trailer

| min GOP size | max GOP size | bitrate | bitrate savings |
| --- | --- | --- | --- |
| 250 | 250 | 26.74 | |
| 250 | 1000 | 21.56 | 19 |
| 250 | 5000 | 20.07 | 24 |
| 60 | 60 | 48.12 | |
| 60 | 1000 | 22.9 | 52 |
| 60 | 5000 | 21.47 | 55 |

TABLE 7

Scene with moving foliage and cars

| min GOP size | max GOP size | bitrate | bitrate savings |
| --- | --- | --- | --- |
| 250 | 250 | 50.81 | |
| 250 | 1000 | 42.74 | 15 |
| 250 | 5000 | 40.57 | 20 |
| 60 | 60 | 83 | |
| 60 | 1000 | 43.28 | 47 |
| 60 | 5000 | 41.25 | 50 |

As described above, segmented objects can be classified as being assigned to or belonging to 1 of L object classes (e.g., person, animal, automobile, etc.) through the classification process, and weights can be assigned to each of the object classes to establish relative priorities among the object classes. When a scene includes multiple objects belonging to different classes, the GOP size can be adapted or modified based on the class to which the objects are assigned and on the weighted priorities of those classes.

Combining Region-Based Coding by Varying QP and Adaptive I-Frame Placement

Using Region-based Coding by Varying QP, a background region is coded at a relatively higher QP value than a foreground object of interest (e.g., target person) in such a way that fewer bits are allocated to the background than the foreground object. Since the number of pixels of the foreground object is typically smaller than the background region, this significantly reduces the total number of bits used to compress the frame without significantly compromising quality. Using Adaptive I-frame Placement, a video frame is encoded as an I-frame only when an object is detected entering or leaving the scene. Thus, fewer I-frames are necessary when compressing the image. Using fewer I-frames reduces the overall bitrate without degradation in quality.

Tables 8-10 illustrate results obtained by combining both Region-based Coding by Varying QP and Adaptive I-frame Placement to achieve a greater reduction in bitrate when compressing the scenes shown in FIG. 13. Tables 8-10 are similar to Tables 5-7 but include an additional column indicating QP values and additional rows displaying results of video encoded using different QP values for the foreground objects and background objects. These results are highlighted in the tables. As shown, with a minimum GOP size of 250, a maximum GOP size of 5000, and using foreground and background QP values of (28, 29), the reduction in bitrate is between 32% and 42%, depending on the content of the scene. With a minimum GOP size of 60, a maximum GOP size of 5000, and using foreground and background QP values of (28, 29), the bitrate savings is between 54% to 67%.

TABLE 8

Entrance of building

| min GOP size | max GOP size | QP | bitrate | bitrate savings |
|---|---|---|---|---|
| 250 | 250 | 28 | 84.76 | |
| 250 | 1000 | 28 | 76.68 | 10 |
| 250 | 5000 | 28 | 75.4 | 11 |
| *250* | *5000* | *28,29* | *57.54* | *32* |
| 60 | 60 | 28 | 132.04 | |
| 60 | 1000 | 28 | 80.44 | 39 |
| 60 | 5000 | 28 | 79.17 | 40 |
| *60* | *5000* | *28,29* | *60.86* | *54* |

TABLE 9

Trailer

| min GOP size | max GOP size | QP | bitrate | bitrate savings |
|---|---|---|---|---|
| 250 | 250 | 28 | 26.74 | |
| 250 | 1000 | 28 | 21.56 | 19 |
| 250 | 5000 | 28 | 20.07 | 24 |
| *250* | *5000* | *28,29* | *15.6* | *42* |
| 60 | 60 | 28 | 48.12 | |
| 60 | 1000 | 28 | 22.9 | 52 |
| 60 | 5000 | 28 | 21.47 | 55 |
| *60* | *5000* | *28,29* | *15.89* | *67* |

TABLE 10

Scene with moving foliage and cars

| min GOP size | max GOP size | QP | bitrate | bitrate savings |
|---|---|---|---|---|
| 250 | 250 | 28 | 50.81 | |
| 250 | 1000 | 28 | 42.74 | 15 |
| 250 | 5000 | 28 | 40.57 | 20 |
| *250* | *5000* | *28,29* | *32.56* | *36* |
| 60 | 60 | 28 | 83 | |
| 60 | 1000 | 28 | 43.28 | 47 |
| 60 | 5000 | 28 | 41.25 | 50 |
| *60* | *5000* | *28,29* | *32.99* | *60* |

GOP Structure: Adaptive B-Frame Placement (Main, Extended and High Profiles)

A B-frame provides higher compression at the expense of greater visual distortion (i.e., lower visual quality). In high-motion scenes, B-frames typically result in noticeably poorer video quality. An adaptive B-frame placement algorithm can be used to vary the number of B-frames. For example, the placement of B-frames can change from a high-motion scene (e.g. ESPN sports program) to a low-motion scene (e.g., a news program). In another example, the placement of B-frames can change from a low-motion scene to a high-motion scene. Motion information from the tracking module can be used to indicate the level of motion in the scene. In low-motion scenes, for example, B-frames can be included into the GOP structure to benefit from greater bit savings while maintaining reasonably good quality, while for high-motion scenes, the number of B-frames can be reduced or omitted.

I/P/Skipped Mode Decision Based on Video Analytics Results

In some embodiments, a P-frame can include intra-coded (I) macroblocks (MBs), predictive-coded (P) MBs, bidirectionally-predictive-coded (B) MBs or skipped MBs. I MBs contain full frame information for an MB that is independent of other frames, while P or B MBs, represent or are associated with image differences of an MB across frames. A skipped MB contains no information about the MB. As such, if an MB is coded in a frame as a skipped MB, the MB in the frame will be identical to the MB in the previous frame. Note that in the H.264 standard, an I MB can be spatially predicted using intra-prediction from previously encoded blocks within the same frame.

In some embodiments, for example, when an object enters/leaves the scene, instead of coding the entire frame as an I-frame, the picture can be coded as a P-frame with MBs corresponding to the foreground object coded as one or more I MBs. MBs can be encoded as I, P or skipped MBs at regions having substantial changes, minor changes or no changes, respectively. The amount of change can be determined using analytics. When an object enters or leaves a scene, the background likely includes little or no change. Accordingly, in some embodiments, the frame can be encoded as a P-frame instead of an I-frame. Further, MBs in the regions of the background with little or no changes can be encoded as P MBs or skipped MBs, while MBs of a foreground object can be encoded as I MBs. This can reduce the overall bitrate while maintaining the segmented object at a higher visual quality than the background.

In some embodiments, motion information from the tracking module can be used to determine if a background MB should be coded as a P MB or a skipped MB. For example, the MBs corresponding to a background region having moving foliage (such as wavering trees) can be coded as P MBs while the MBs corresponding to a static background region can be coded as skipped MBs. In some embodiments, the foreground MBs can be coded as I MBs when a scene change occurs in a frame. For example, the foreground MBs can be coded as I MBs when an object is detected entering or leaving the scene.

In some embodiments, whether to use I MBs, P MBs or skipped MBs can be determined using the Mean Absolute Difference (MAD) between pixels in an original image and pixels in a predicted image. The MAD can be compared against a threshold to determine if the MB should be an I MB or a P MB. Such an approach, however, includes a high computation complexity due to the need to compute the MAD. Furthermore, the chosen threshold may not guarantee that all MBs of the foreground object will be coded as I MBs.

In other embodiments, segmentation and classification output can be used to directly perform the I/P/skipped mode selection. Encoding the MBs corresponding to the static background regions as skipped MBs reduces the overall bitrate without quality degradation. In one embodiment, for example, the segmented background MBs can be encoded as skipped MBs except where the tracking module identifies significant motion in the MB. Such motion may be due to, for example, foliage or water, which is a real change, but not a classified foreground object. Foliage background MBs can be coded as P MBs while fully static background MBs can be coded as skipped MBs. In another embodiment, the class of foreground object type (e.g., person, animal, automobile, etc.) can be used to determine the encoding mode. MBs that are part of the foreground and classified as a Person might be encoded as I MBs while foreground MBs that are classified as Animals may be encoded as P MBs. This increases the compression efficiency and the compression gain for Standard-Definition (SD) video. The gain is higher for High-Definition (HD) video. In such embodiments, the region/object properties from the analytics modules can be used instead of block-based local statistics. The region and/or object properties reflect the semantics of the video better than the block-based local statistics. In such a manner, MAD computation and thresholding can be avoided, resulting in lower computational overhead and higher accuracy.

Modify MV Search Range with Constraints Bounded by Selected Profile

Inter frames, whether B-frames or P-frames, are predicted from reference frames. In motion estimation, a search area is defined and a motion estimation algorithm is used to find a prediction block that best matches the current block to produce a motion-compensated prediction (MCP) block, which is then transformed, quantized and entropy coded. The vertical and horizontal displacements between the prediction and current block are coded as motion vectors (MVs), which can themselves be predictively coded as well.

The motion estimation search area is typically determined by the MV search range. The vertical MV search range is bounded by the different types of profiles and levels in the H.264 standard. Most of the computational complexity of a video encoder typically occurs in the motion estimation. A large search area can result in high computational complexity while a small range can restrict or reduce the inter-frame prediction accuracy. In some embodiments, the scene-adaptive video coding includes methods to find an adequate search range with a good trade-off in accuracy and complexity. For example, the motion information or data from the tracking module in the video analytics processing pipeline could be used to select an MV range. The tracking module provides the motion trajectory for a foreground blob. This trajectory can be used to select the motion vector search range for all the macroblocks corresponding to the foreground blob. This approach saves computation because the same motion estimate can be re-used for all macroblocks corresponding to that blob. Further motion vectors (MV) are predicted for foreground blobs that have been classified as rigid objects such as cars because all macroblocks corresponding to the car typically move together.

Figure 10A:
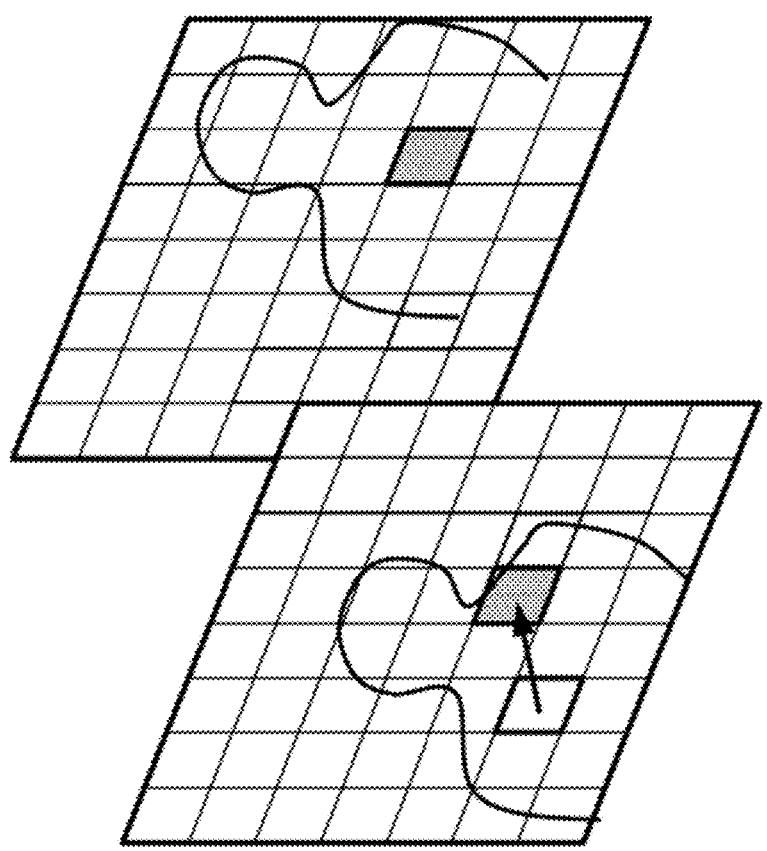
FIGS. 10A-10B illustrate different approaches to determining a motion vector search range, according to embodiments.
Figure 10B:
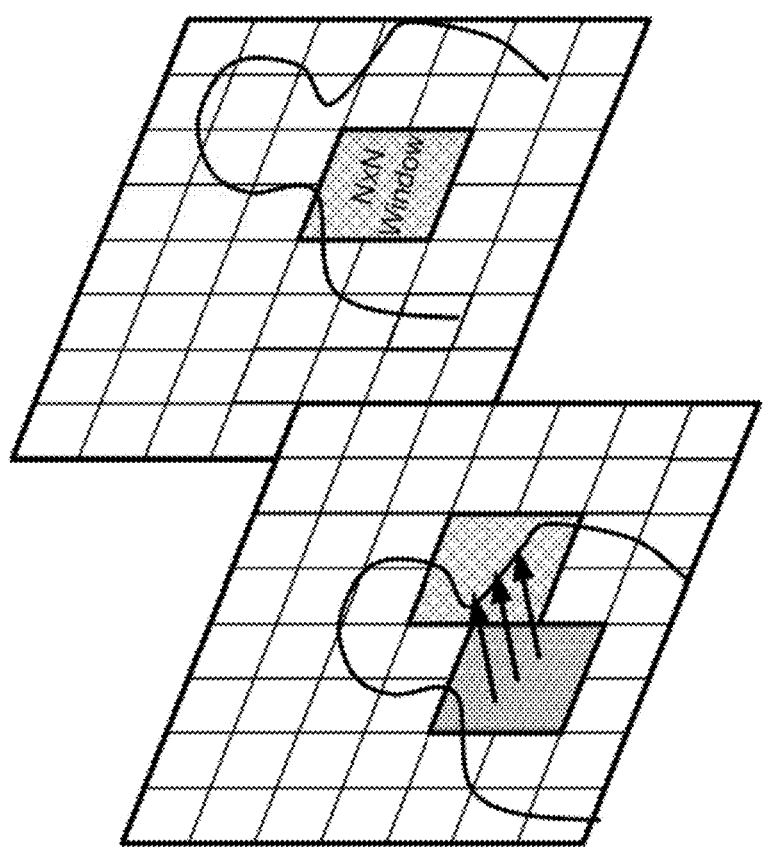

FIGS. 10A-10B illustrate different approaches to determine a motion vector search range, according to embodiments. The approach described in FIG. 10A includes tracking the centroid of a matched pair of blocks across consecutive frames. The centroids of the matched pair of blocks are compared to determine the range. The approach described in FIG. 10B includes considering the neighborhood pixels of the centroid. An N×N window is centered on the centroid and the displacements over the blocks (e.g., macroblocks) in the window are aggregated.

Using Classification Results

The MV search range can be scaled based on the weighted priorities of the object classes. As described above, most of the computational complexity of a video encoder occurs in the motion estimation. A large search area results in high computational complexity while a small range restricts or reduces the inter-frame prediction accuracy. The size of the search area can be scaled based on the weight associated with the class assigned to an object such that a higher-priority object is associated with a larger search range. Alternately, a different set of search ranges can be used for objects corresponding to different classes. For instance, cars move more rapidly compared to people hence blobs corresponding to cars would have a larger search range. For a scene consisting of a number of objects belonging to different classes, the average of the motion information of objects belonging to the same class is first determined. The weighted average of the aggregated motion information of different classes is then used to determine a final search range. Alternatively, the final search range can be based on the aggregate motion information of objects belonging to the class having the maximum weight. Moreover, the final search range can be based on a dominant MV determined from a MV histogram.

The search range can be updated on a frame-by-frame basis, over a window size, or over a GOP, for example. The search range can be updated less frequently, i.e., over a larger window size for lower-priority objects or for slow moving objects. Based on the motion history, when objects exhibit consistent motion pattern, the search range is unlikely to change from frame to frame.

For objects classified as persons, a better estimation of an appropriate search range is to consider the blocks of pixels (e.g. macroblocks) at the lower half section of the person where there is more temporal activity (e.g., moving legs). Objects of higher priority can be coded with higher fidelity than others by assigning a QP value based on the weights of the object classes. The weights of these object classes, in addition to the HVS factors, can be incorporated into the RC process to modify the QP values as described above.

FIGS. 11A-11E illustrate analytics-modulated coding of video images, according to other embodiments. Table 11, below, describes preliminary results associated with FIGS. 11A-11E.

TABLE 11

Filename of raw sequence: foreman-part-qcif.yuv
Resolution: 176 × 144
Frame rate: 30fps
Encoded video: H.264 Baseline Profile
Slice group map type: 2
Slice group config file: sg2conf.cfg

Figure 11C:
FIGS. 11A-11E illustrate analytics-modulated coding of video images, according to other embodiments.
Figure 11B:
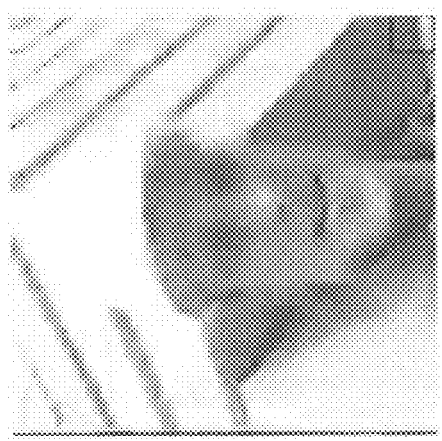
Figure 11E:
Figure 11A:
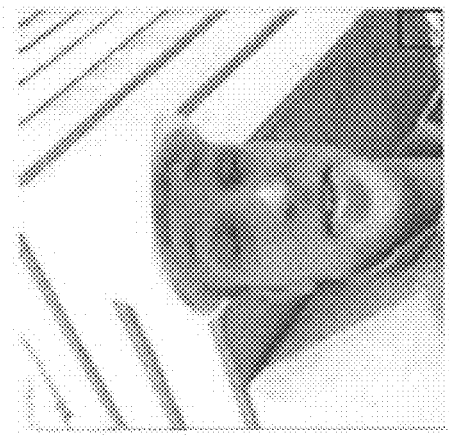
Figure 11D:

| I-frame | FIG. 11A fg28-bg28 | FIG. 11B fg45-bg45 | FIG. 11C fg28-bg45 | FIG. 11D fg45-bg28 | FIG. 11E fg28-bg40 |
|---|---|---|---|---|---|
| bits | 22584 | 4896 | 9512 | 18008 | 11224 |
| SNR (Y) | 37.43 | 25.97 | 26.93 | 32.12 | 30.11 |
| SNR (U) | 41.28 | 36.52 | 37.48 | 39.35 | 38.23 |
| SNR (V) | 42.82 | 36.77 | 38.15 | 39.61 | 39.22 |

Figure 12A:
FIGS. 12A-12C illustrate analytics-modulated coding of video images, according to other embodiments.
Figure 12B:
Figure 12C:

FIGS. 12A-12C illustrate analytics-modulated coding of video images, according to other embodiments. Table 12, below, describes preliminary results associated with FIGS. 12A-12C.

TABLE 12

| | FIG. 12A fg28-bg28 | FIG. 12B fg28-bg40 | FIG. 12C fg28-bg35 |
|---|---|---|---|
| I-frame | | | |
| bits | 109488 | 32896 | 53800 |
| SNR(Y) | 36.81 | 28.18 | 31.3 |
| SNR(U) | 40.34 | 36.33 | 37.78 |
| SNR(V) | 38.86 | 34.51 | 35.75 |
| 1st P-frame | | | |
| bits | 2448 | 2272 | 2344 |
| SNR(Y) | 35.41 | 28.1 | 31 |
| SNR(U) | 39.92 | 36.24 | 37.6 |
| SNR(V) | 38.25 | 34.36 | 35.54 |
| 2nd P-frame | | | |
| bits | 2584 | 2152 | 2256 |
| SNR(Y) | 35.76 | 28.1 | 31.1 |
| SNR(U) | 40.14 | 36.34 | 37.75 |
| SNR(V) | 38.38 | 34.44 | 35.58 |

In one embodiment, a method includes assigning a class from multiple classes to a foreground object from a video frame. The foreground object has multiple pixels. Each class from among the multiple classes has associated therewith a quantization parameter value. Multiple discrete cosine transform (DCT) coefficients are produced for pixels from the multiple pixels of the video frame associated with the foreground object. The DCT coefficients associated with the foreground object are quantized based on the quantization parameter value associated with the class assigned to the foreground object. The method further includes coding the quantized DCT coefficients associated with the foreground object.

The foreground object can be a first foreground object, the class assigned to the foreground object can be a first class, and the quantization parameter value associated with the first class can be a first quantization parameter value. A second class from among multiple classes can be assigned to a second foreground object from the video frame, the second class being different from the first class. Multiple DCT coefficients can be produced for pixels from the multiple pixels of the video frame associated with the second foreground object. The multiple DCT coefficients associated with the second foreground object can be quantized based on the quantization parameter value associated with the second class assigned to the second foreground object. The method further includes coding the quantized DCT coefficients associated with the second foreground object.

The video frame can include a background portion. Multiple DCT coefficients can be produced for pixels from the multiple pixels of the video frame associated with the background portion of the video frame. The multiple DCT coefficients associated with the background portion of the video frame can be quantized based on a quantization parameter value greater than the quantization parameter associated with each class from among the multiple classes. The method further includes coding the quantized DCT coefficients associated with the background portion of the video frame.

The class assigned to the foreground object can be a first class. The multiple classes can include a second class that is different from the first class. The first class can have an associated coding priority and an associated quantization parameter value. The second class can have an associated coding priority and an associated quantization parameter value. The quantization parameter value associated with the first class can be less than the quantization parameter value associated with the second class when the coding priority associated with the first class is greater than the coding priority associated with the second class.

The multiple pixels of the video frame can be organized into multiple blocks of pixels. Multiple DCT coefficients can be produced for each block of pixels from the multiple blocks of pixels of the video frame associated with the foreground object. The multiple DCT coefficients of each block of pixels associated with the foreground object can be quantized based on the quantization parameter value associated with the class assigned to the foreground object. The method further includes coding the quantized DCT coefficients associated with the foreground object.

The foreground object includes at least one block of pixels from multiple blocks of pixels of the video frame. The least one block of pixels associated with the foreground object can define a contour associated with the foreground object.

In another embodiment, a method includes assigning a class from among multiple classes to a foreground object from a video frame having multiple pixels. A quantization parameter value associated with the foreground object is derived based on at least one of a target bit rate, the number and size of objects in the scene and a weight associated with the class assigned to the foreground object, wherein the weight is based on a coding priority associated with the class assigned to the foreground object. The adjustment can include scaling the quantization parameter value associated with the foreground object based on at least one of the target bit rate, the number and size of objects in the scene and the weight associated with the class assigned to the foreground object. Multiple DCT coefficients are produced for pixels from the plurality of pixels of the video frame associated with the foreground object. The DCT coefficients associated with the foreground object are quantized based on the computed quantization parameter value. The method further includes coding the quantized DCT coefficients associated with the foreground object.

The method can include coding the video frame via two pass encoding. A first pass operation can be performed using a low-complexity encoder to produce statistics (e.g., brightness, spatial and temporal frequencies) in order to take into account the characteristics of the Human Visual System (HVS). In addition to these HVS factors, the quantization parameter value associated with the foreground object can be derived based on the target bit rate, the number and size of objects in the scene and the weight associated with the class assigned to the foreground object. In other embodiments, the method can include generating gradient information associated with the video frame via a single pass through the video frame and deriving a Human Visual System (HVS) factor associated with the video frame using the gradient information. In such embodiments, the quantization parameter value associated with the foreground object can be computed and/or adjusted based on at least one of the target bit rate, the weight associated with the class assigned to the foreground object, and the Human Visual System factor.

The foreground object can be a first foreground object, the class assigned to the foreground object can be a first class, the weight associated with the first class can be a first weight, and the quantization parameter value associated with the first foreground object can be a first quantization parameter value. A second class from among the multiple classes can be assigned to a second foreground object from the video frame. The second class can be different from the first class. A second quantization parameter value associated with the second foreground object can be derived based on at least one of a target bit rate, the number and size of objects in the scene and a second weight associated with the second class assigned to the second foreground object. The second quantization parameter value can be different from the first quantization parameter value and the second weight can be different from the first weight. Multiple DCT coefficients can be produced for pixels from the multiple pixels of the video frame associated with the second foreground object. The DCT coefficients associated with the second foreground object can be quantized based on the adjusted second quantization parameter value. The method further includes coding the quantized DCT coefficients associated with the second foreground object.

In yet another embodiment, a method includes assigning a class from multiple classes to a foreground object from a first video frame having multiple blocks of pixels. The foreground object includes a block of pixels from the multiple blocks of pixels of the first video frame. Each class from among the multiple classes has associated therewith a coding priority. The method further includes identifying in a second video frame with multiple blocks of pixels a prediction block of pixels associated with the block of pixels in the foreground object. The identification is based on a prediction search window that has a search area associated with the coding priority of the class assigned to the foreground object. The method also includes coding the first video frame based on the identified prediction block of pixels.

The search area of the prediction search window can be updated according to tracked motion information associated with the foreground object over multiple video frames including the first video frame. The search area of the prediction search window can be adjusted based on moving portions of the foreground object.

The class assigned to the foreground object can be a first class. The multiple classes include a second class different from the first class. The first class can have an associated coding priority and an associated prediction search window. The second class can have an associated coding priority and an associated prediction search window. A search area of the prediction search window associated with the first class can be smaller than a search area of the prediction search window associated with the second class when the coding priority associated with the first class is lower than the coding priority associated with the second class.

In another embodiment, a method includes tracking motion information associated with a foreground object in a first video frame having multiple blocks of pixels. The foreground object includes a block of pixels from the multiple blocks of pixels of the first video frame. The method further includes identifying in a second video frame having multiple blocks of pixels a prediction block of pixels associated with the block of pixels in the foreground object. The identifying can be based on a prediction search window having a search area associated with the tracked motion information associated with the foreground object. The method also includes coding the first video frame based on the identified prediction block of pixels.

A class from multiple classes can be assigned to the foreground object. Each class from among the multiple classes has associated therewith a coding priority. The search area of the prediction search window can be updated according to the coding priority associated with the class assigned to the foreground object.

In yet another embodiment, a method includes assigning a class from multiple classes to a foreground object from a picture in a group of pictures (GOP). Each class from among the multiple classes has associated therewith a coding priority. The method further includes tracking motion information associated with the foreground object over multiple pictures. The method also includes inserting an intra-frame picture in the GOP based on at least one of the tracked motion information associated with the foreground object and the coding priority associated with the class assigned to the foreground object.

A structure associated with the GOP can be modified based on segmentation results associated with the foreground object and with the coding priority associated with the class assigned to the foreground object. A number of pictures associated with the GOP can be modified based on segmentation results and tracked motion information associated with the foreground object as well as based on the coding priority associated with the class assigned to the foreground object.

In another embodiment, a method includes assigning a class from multiple classes to a foreground object from a picture in a GOP. Each class from among the multiple classes has associated therewith a coding priority. The method further includes tracking motion information associated with the foreground object over multiple pictures. The method also includes selectively replacing a block of pixels in the foreground object with an intra-coded block of pixels based on at least one of the tracked motion information associated with the foreground object and the coding priority associated with the class assigned to the foreground object.

In another embodiment, a method includes segmenting a foreground object from a background of a picture in a group of pictures (GOP). Motion information associated with a block of pixels of the foreground object, a first block of pixels of the background, and a second block of pixels of the background is tracked. The block of pixels of the foreground object is encoded as an intra-coded block of pixels based on the motion information associated with the block of pixels of the foreground object. The first block of pixels of the background is encoded as a predictive-coded block of pixels based on the motion information associated with the first block of pixels of the background. The second block of pixels of the background is encoded as a skipped block of pixels based on the motion information associated with the second block of pixels of the background. In some embodiments, the tracking of motion information can include detecting motion in the first block of pixels of the background and detecting an absence of motion in the second block of pixels of the background.

CONCLUSION

While various embodiments have been described above, it should be understood that they have been presented by way of example only, and not limitation. For example, the scene-adaptive video encoding can include a subset of the intermediate outputs produced by the video analytics processing pipeline.

Some embodiments include a processor and a related processor-readable medium having instructions or computer code thereon for performing various processor-implemented operations. Such processors can be implemented as hardware modules such as embedded microprocessors, microprocessors as part of a computer system, Application-Specific Integrated Circuits ("ASICs"), and Programmable Logic Devices ("PLDs"). Such processors can also be implemented as one or more software modules in programming languages as Java, C++, C, assembly, a hardware description language, or any other suitable programming language.

A processor according to some embodiments includes media and computer code (also can be referred to as code) specially designed and constructed for the specific purpose or purposes. Examples of processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as optical disks, and read-only memory ("ROM") and random-access memory ("RAM") devices. Examples of computer code include, but are not limited to, micro-code or micro-instructions, machine instructions, such as produced by a compiler, and files containing higher-level instructions that are executed by a computer using an interpreter. For example, an embodiment of the invention can be implemented using Java, C++, or other object oriented programming language and development tools. Additional examples of computer code include, but are not limited to, control signals, encrypted code, and compressed code.

What is claimed is:

1. A non-transitory processor-readable medium storing code representing instructions to be executed by a processor, the code comprising code to cause the processor to:
- receive a group of pictures (GOP) including (1) a first video frame having a plurality of pixels and (2) a second video frame having a plurality of pixels;
- segment from the first video frame a plurality of foreground objects from a background, a foreground object from the plurality of foreground objects of the first video frame having pixels from the plurality of pixels of the first video frame organized into a pixel blob;
- classify, based on the first video frame and no other video frame from the GOP, the pixel blob into a class from a plurality of predefined classes, each class from the plurality of predefined classes being an object type;
- define a search area of a prediction search window based at least in part on the class within which the pixel blob was classified;
- code to produce a coded video frame based at least in part on a weight assigned to the class and a quantity of foreground objects from the plurality of foreground objects within the first video frame; and
- send a representation of the coded video frame.

2. The non-transitory processor-readable medium of claim 1, the code further comprising code to cause the processor to:
- track motion information associated with the pixel blob in the first video frame and the second video frame, the motion information including a speed associated with the foreground object;
- define the search area of the prediction search window based at least in part on the speed; and
- identify in a third video frame the foreground object based on the search area of the prediction search window.

3. The non-transitory processor-readable medium of claim 1, wherein the code to cause the processor to code the first video frame includes code to cause the processor to code the first video frame based on a prediction block of pixels.

4. The non-transitory processor-readable medium of claim 1, wherein the code to cause the processor to classify includes code to cause the processor to classify the pixel blob into the class based at least in part on at least one of an aspect ratio of the pixel blob, a histogram associated with the pixel blob, or an outline of the pixel blob.

5. The non-transitory processor-readable medium of claim 1, the code further comprising code to cause the processor to:
- track motion information associated with the pixel blob in the first video frame and the second video frame; and
- define the search area of the prediction search window based at least in part on the motion information and the quantity of foreground objects.

6. The non-transitory processor-readable medium of claim 1, the code further comprising code to cause the processor to:
- track motion information associated with the pixel blob in the first video frame and the second video frame;
- define the search area of the prediction search window based at least in part on the motion information; and
- identify in a third video frame a prediction block of pixels associated with the pixel blob of the first video frame based on the prediction search window, the search area having a search area associated with a coding priority assigned to the class.

7. A non-transitory processor-readable medium storing code representing instructions to be executed by a processor, the code comprising code to cause the processor to:
- receive a group of pictures (GOP) including (1) a first video frame having a plurality of pixels and (2) a second video frame having a plurality of pixels;
- segment from the first video frame a foreground object from a background, the foreground object of the first video frame having pixels from the plurality of pixels of the first video frame organized into a pixel blob;
- classify, based on the first video frame and no other video frame from the GOP, the pixel blob into a class from a plurality of predefined classes, each class from the plurality of predefined classes being an object type;
- define a search area of a prediction search window based at least in part on the class within which the pixel blob was classified;
- identify macroblocks corresponding to pixels in the pixel blob;
- code the identified macroblocks as at least one of an intra-coded macroblock, a predictive macroblock, or a skipped macroblock, based on (1) a priority assigned to the class within which the pixel blob was classified, and (2) a number of foreground objects in the first video frame; and
- send a signal indicative of the coded identified macroblocks.

8. The non-transitory processor-readable medium of claim 7, the code further comprising code to cause the processor to track motion information associated with the pixel blob in the first video frame and the second video frame, the code to cause the processor to code the identified macroblocks includes code to cause the processor to code the identified macroblocks based on the motion information.

9. A non-transitory processor-readable medium storing code representing instructions to be executed by a processor, the code comprising code to cause the processor to:
- receive a plurality of pictures associated with a scene;
- identify a foreground object from a first picture from the plurality of pictures;
- identify, based on the first picture a class of the foreground object from a plurality of predetermined classes, each class from the plurality of predetermined classes being an object type;
- track motion information associated with the foreground object based at least in part on a second picture (1) from the plurality of pictures and (2) generated subsequent to the first picture; and
- define a search area of a prediction search window for each picture from the plurality of pictures based on the motion information, the class assigned to the foreground object, and a number of objects in the first picture.

10. The non-transitory processor-readable medium of claim 9, wherein the foreground object includes pixels organized into a pixel blob, the code further comprising code to cause the processor to:
- identify a macroblock corresponding to pixels in the pixel blob; and
- code the identified macroblock as an intra-coded macroblock, a predictive macroblock, or a skipped macroblock, based at least in part on at least one of the class of the foreground object or the motion information associated with the foreground object.

11. The non-transitory processor-readable medium of claim 1, the code further comprising code to cause the processor to track motion information associated with the pixel blob in the first video frame and the second video frame, the motion information including a representation of articulated motion that changes a shape of the pixel blob between the first video frame and the second video frame.

12. The non-transitory processor-readable medium of claim 1, the code further comprising code to cause the processor to track motion information associated with the pixel blob in the first video frame and the second video frame,
the code to cause the processor to code at least one of the first video frame or the second video frame includes code to cause the processor to code at least one of the first video frame or the second video frame to produce a coded video frame based at least in part on (1) the weight assigned to the class, and (2) the motion information.

13. The non-transitory processor-readable medium of claim 9, wherein the code to cause the processor to define the search area includes code to cause the processor to define the search area based on a weight associated with the class assigned to the foreground object.

14. The non-transitory processor-readable medium of claim 1, wherein the code to cause the processor to code includes code to cause the processor to code at least one of the first video frame or the second video frame to produce the coded video frame based at least in part on a size of the foreground object.

15. The non-transitory processor-readable medium of claim 1, wherein the code to cause the processor to code includes code to cause the processor to code at least one of the first video frame or the second video frame to produce the coded video frame based at least in part on a number of objects in the first picture.

16. The non-transitory processor-readable medium of claim 1, wherein the code to cause the processor to code includes code to cause the processor to code at least one of the first video frame or the second video frame to produce the coded video frame based at least in part on a human visual system (HVS) factor.

17. The non-transitory processor-readable medium of claim 9, wherein the code to cause the processor to define the search area includes code to cause the processor to define the search area based on an average of (1) motion information associated with the foreground object and (2) motion information associated with another object identified in at least one of the first picture or the second picture.

18. The non-transitory processor-readable medium of claim 9, wherein the code to cause the processor to define the search area includes code to cause the processor to define the search area based on an average of (1) motion information associated with the foreground object and (2) motion information associated with all other objects identified in at least one of the first picture or the second picture that are of a class identical to the class of the foreground object.

19. The non-transitory processor-readable medium of claim 7, wherein the code to cause the processor to code the identified macroblocks includes code to cause the processor to code the identified macroblocks based at least in part on a human visual system (HVS) factor and a size of the foreground object.

20. The non-transitory processor-readable medium of claim 7, the code further comprising code to cause the processor to:
define the search area of the prediction search window based at least in part on the number of foreground objects in the first video frame.

21. A non-transitory processor-readable medium storing code representing instructions to be executed by a processor, the code comprising code to cause the processor to:
receive a plurality of pictures associated with a scene;
identify a foreground object from a first picture from the plurality of pictures;
identify, based on the first picture, a class of the foreground object from a plurality of predetermined classes, each class from the plurality of predetermined classes being an object type;
track motion information associated with the foreground object based at least in part on a second picture (1) from the plurality of pictures and (2) generated subsequent to the first picture; and
define a search area of a prediction search window for each picture from the plurality of pictures based on an average of (1) motion information associated with the foreground object and (2) motion information associated with another object identified in at least one of the first picture or the second picture.

22. The non-transitory processor-readable medium of claim 21, wherein the foreground object includes pixels organized into a pixel blob, the code further comprising code to cause the processor to:
identify a macroblock corresponding to pixels in the pixel blob; and
code the identified macroblock as an intra-coded macroblock, a predictive macroblock, or a skipped macroblock, based at least in part on at least one of the class of the foreground object or the motion information associated with the foreground object.

23. The non-transitory processor-readable medium of claim 21, wherein the code to cause the processor to define the search area includes code to cause the processor to define the search area based on a weight associated with the class assigned to the foreground object.

24. A non-transitory processor-readable medium storing code representing instructions to be executed by a processor, the code comprising code to cause the processor to:
receive a plurality of pictures associated with a scene;
identify a foreground object from a first picture from the plurality of pictures;
identify, based on the first picture, a class of the foreground object from a plurality of predetermined classes, each class from the plurality of predetermined classes being an object type;
track motion information associated with the foreground object based at least in part on a second picture (1) from the plurality of pictures and (2) generated subsequent to the first picture; and
define a search area of a prediction search window for each picture from the plurality of pictures based on an average of (1) motion information associated with the foreground object and (2) motion information associated with all other objects identified in at least one of the first picture or the second picture that are of a class identical to the class of the foreground object.

25. The non-transitory processor-readable medium of claim 24, wherein the foreground object includes pixels organized into a pixel blob, the code further comprising code to cause the processor to:
identify a macroblock corresponding to pixels in the pixel blob; and
code the identified macroblock as an intra-coded macroblock, a predictive macroblock, or a skipped macroblock, based at least in part on at least one of the class of the foreground object or the motion information associated with the foreground object.

26. The non-transitory processor-readable medium of claim 24, wherein the code to cause the processor to define the search area includes code to cause the processor to define the search area based on a weight associated with the class assigned to the foreground object.

27. The non-transitory processor-readable medium of claim 9, wherein the code to cause the processor to identify the class of the foreground object includes code to cause the processor to identify the class of the foreground object based on the first picture and no other pictures from the plurality of pictures.

\* \* \* \* \*